US007054857B2

(12) United States Patent
Cunningham et al.

(10) Patent No.: US 7,054,857 B2
(45) Date of Patent: May 30, 2006

(54) USE OF EXTENSIBLE MARKUP LANGUAGE IN A SYSTEM AND METHOD FOR INFLUENCING A POSITION ON A SEARCH RESULT LIST GENERATED BY A COMPUTER NETWORK SEARCH ENGINE

(75) Inventors: Stephan Cunningham, Burbank, CA (US); Anthony Molinaro, Pasadena, CA (US); Frank Maritato, Jr., Pasadena, CA (US); Peng Zhao, Alhambra, CA (US); Nick Conrad, Glendale, CA (US)

(73) Assignee: Overture Services, Inc., Pasadena, CA (US)

( * ) Notice: Subject to any disclaimer, the term of this patent is extended or adjusted under 35 U.S.C. 154(b) by 593 days.

(21) Appl. No.: 10/141,385

(22) Filed: May 8, 2002

(65) Prior Publication Data

US 2003/0212648 A1      Nov. 13, 2003

(51) Int. Cl.
*G06F 17/30* (2006.01)
(52) U.S. Cl. .................. 707/3; 707/10; 707/104.1; 705/37
(58) Field of Classification Search ............... 707/3, 707/4, 6, 10, 102, 104.1; 705/37
See application file for complete search history.

(56) References Cited

U.S. PATENT DOCUMENTS

| 5,659,732 A | 8/1997 | Kirsch ...................... 395/605 |
| 5,717,923 A | 2/1998 | Dedrick .................... 396/613 |
| 5,724,424 A | 3/1998 | Gifford ...................... 380/24 |
| 5,724,521 A | 3/1998 | Dedrick .................... 395/226 |
| 5,724,524 A | 3/1998 | Hunt et al. ................ 395/237 |
| 5,748,954 A | 5/1998 | Maudlin .................... 395/610 |
| 5,752,238 A | 5/1998 | Dedrick ..................... 705/14 |
| 5,768,521 A | 6/1998 | Dedrick .................... 395/226 |
| 5,778,367 A | 7/1998 | Wesinger, Jr. et al. |
| 5,794,210 A | 8/1998 | Goldhaber et al. ........... 705/14 |
| 5,826,241 A | 10/1998 | Stein et al. ................. 705/26 |
| 5,848,397 A | 12/1998 | Marsh et al. ............... 705/14 |
| 5,848,407 A | 12/1998 | Ishikawa et al. ............. 707/2 |
| 5,852,820 A | 12/1998 | Burrows ..................... 707/2 |
| 5,855,008 A | 12/1998 | Goldhaber et al. ........... 705/14 |
| 5,862,223 A | 1/1999 | Walker et al. |

(Continued)

FOREIGN PATENT DOCUMENTS

WO      WO 97/22066 A      6/1997

(Continued)

OTHER PUBLICATIONS

European Search Report for corresponding patent application No. EP 03 25 2891, dated Sep. 4, 2003, 2 pages.

(Continued)

*Primary Examiner*—Leslie Wong
(74) *Attorney, Agent, or Firm*—Brinks Hofer Gilson & Lione

(57) ABSTRACT

A database search apparatus and method for generating a search result list which responds to Extensible Markup Language (XML) requests from a client to a server of an on-line marketplace. A bid management tool is operable on a client computer to manage search listings and account information of one or more advertisers. The client application communicates with the server via an XML-based application program interface. The bid management tool provides functions for reporting account activity, modifying accounts and manual, timed or event-driven changes to search listings including listings of several advertisers.

19 Claims, 4 Drawing Sheets

U.S. PATENT DOCUMENTS

| | | | | |
|---|---|---|---|---|
| 5,864,845 | A | 1/1999 | Voorhees et al. | 707/5 |
| 5,864,846 | A | 1/1999 | Voorhees et al. | 707/5 |
| 5,903,882 | A | 5/1999 | Asay et al. | 705/44 |
| 5,918,014 | A | 6/1999 | Robinson | 395/200.49 |
| 5,920,854 | A | 7/1999 | Kirsch et al. | 707/3 |
| 5,920,859 | A | 7/1999 | Li | 707/5 |
| 5,930,777 | A | 7/1999 | Barber | 705/40 |
| 6,078,866 | A | 6/2000 | Buck et al. | 702/2 |
| 6,185,558 | B1 | 2/2001 | Bowman et al. | 707/5 |
| 6,269,361 | B1 | 7/2001 | Davis et al. | 707/3 |
| 6,285,987 | B1 | 9/2001 | Roth et al. | |
| 2001/0042064 | A1* | 11/2001 | Davis et al. | 707/3 |
| 2001/0051940 | A1 | 12/2001 | Soulanille | |
| 2002/0004735 | A1 | 1/2002 | Gross | 705/10 |
| 2003/0065805 | A1* | 4/2003 | Barnes | 709/231 |
| 2003/0229545 | A1* | 12/2003 | Veres et al. | 705/26 |
| 2004/0078214 | A1* | 4/2004 | Speiser et al. | 705/1 |
| 2004/0138946 | A1* | 7/2004 | Stolze | 705/14 |

FOREIGN PATENT DOCUMENTS

| | | |
|---|---|---|
| WO | WO 99/20486 | 9/1999 |
| WO | WO 99/48028 | 9/1999 |
| WO | WO 00/16218 A | 3/2000 |
| WO | WO 2000/16218 | 3/2000 |
| WO | WO 2000/41090 | 7/2000 |
| WO | WO 01/33433 A1 | 5/2001 |
| WO | WO 02/27570 A3 | 4/2002 |

OTHER PUBLICATIONS

Great Britain Search Report for corresponding patent application No. GB 0310598.8, dated Sep. 9, 2003, 1 page.

Jung, F. "XML Backgrounder, Technology and Applications", Software AG the XML Company, copyright Feb. 2002, No. XP-002253449, retrieved from the Internet on Sep. 4, 2003, URL:http://www.softwareag.com/tamino/downloaded/e-XML_Backgrounder_XML-WP04E0202.pdf, 14 pages.

Linthicum, D. S., "Chapter 14: XML and B2B Application Integration", B2B Application Integration: E-Business-Enable Your Enterprise, copyright Aug. 2001, Addison-Wesley, No. XP-002253450, pp. 261-276.

Supplementary Search Report for corresponding European Patent Application No. EP 00 936393, dated Feb. 20, 2004, 3 pages.

Brin, Sergey et al., "The Anatomy of a Large Scale Hypertextual Web Search Engine", *Computer Networks and ISDN Systems*, North Holland Publishing, Amsterdam, NL, dated Apr. 14, 1998, pp. 1-20.

Doran, David, "Search Engines . . . Their popularity, their secrets, their flaws", *Entrepreneur*, Jul. 1998, p. 18.

Glaser, Ken, "Who Will GoTo.com?", *OnlinePress.com*, dated Feb. 20, 1998, 2 pages.

Kramer, Ralf et al., "Thesaurus federations: loosely integrated thesauri for document retrieval in networks based on Internet technologies", *Int. J. Digit Libr*, 1997, pp. 122-131.

Sullivan, Danny, "GoTo Sells Positions", *The Search Engine Report*, dated Mar. 3, 1998, 4 pages.

"GoTo.com Announces First Round of Financing, Totaling More Than $6 Million, Led by Draper Fisher Jurvetson", *Business Wire*, dated May 19, 1998, printed from Dialog Gale Group New products, 2 pages.

"New Service Puts Ad Auction, Search Engine Under One Roof", *Electronic Advertising & Marketplace Report*, dated Apr. 28, 1998, vol. 12, Issue 8, 2 pages.

News of The Week articles, *Telephony*, May 1, 1995, pp. 8 and 10.

Nuts 'N Bolts articles, *Target Marketing*, Oct. 1997, 1 page.

DoubleClick TestIt!, obtained at the internet address: http://web.archive.org/web/19980205034316/www.doubleclick.com/nf/adinfo/testiset.htm, dated Oct. 16, 2002, 4 pages.

DoubleClick Frequently Asked Questions, obtained at the internet address: http://web.archive.org/web/19980205033925/www.doubleclick.com/nf/adinfo/facts.htm, dated Oct. 16, 2002, 5 pages.

"New Service Puts Ad Auction, Search Engine Under One Roof", article from Electronic Advertising & Marketplace Report, *Simba Information, Inc.* Apr. 28, 1998, 2 pages.

Google Search, communication from Jeffrey Brewer at Jeffrey@goto.com, titled "Need reverse stemming software", dated May 27, 1998, obtained at the internet address: http://groups.google.com/groups?selm=356CEE4A8DE882A8%40goto.com, on Dec. 19, 2002, 1 page.

Ketchpel, Steven P. et al. "U-PAI: A Universal Payment Application Interface", conference material article from the Second USENIX Workshop on Electronic Commerce Proceedings, Oakland, California, Nov. 18-21, 1996, 17 pages.

Schwartz, Randal L., "Click-Through Tracking in Perl", *Web Techniques*, dated May 1998, located at the internet address: www.webtechniques.com, 3 pages.

Van Roeden, Adriaan, "Your Own Search Engine With SWISH, A Custom Search Facility For Your Web Site", *Web Techniques*, dated Nov. 1996, located at the internet address: www.webtechniques.com, pp. 63-66 pages.

Full Catalog—Categories Menu, Sun Microsystems Sun Solutions Catalog, obtained at the internet address: http://web.archive.org/web/19981205110211/solutions.sun.com/catalogs/all/index.htm, printed on Dec. 19, 2002, 2 pages.

Help on Making Queries—Search by Company or Product, obtained at the internet address: http://web.archive.org/web/19981203050002/solutions.sun.com/search-help.htm, printed on Dec. 19, 2002, 4 pages.

Online Updating, Sun Microsystems Sun Solutions Catalog obtained at the internet address: http://web.archive.org/web/19990220190636/solutions.sun.com/editmodule/help.html, printed on Dec. 19, 2002, 2 pages.

Database of Corporate ResourceNet, "New Service Puts An Auction Search Engine Under One Roof", Electronic Advertising & Marketplace Report, vol. 12, Issue 8, Apr. 1998, p. 6.

Espe, "Online Search Engines Start To Charge For Listings", Washington Business Journal, vol. 18, Issue 1, May 1999, p. 31.

Dawson et al., "2 Search Sites Narrow Their Parameters", Adweek-Western Edition, vol. 48, Issue 42, Oct. 1998, p. 1.

Database of Corporate ResourceNet, "Bits", from Adweek-Eastern Edition, vol. 40, Issue 14, Apr. 1999, p. 46.

Komando, "Searching For Search Engines—from Dogpile to Deja News", Business First-Colombus, vol. 14, Issue 43, Jun. 1998, p. 46.

Database of Corporate ResourceNet, New services Aim to Boost Efficiency of Search Engines Electronic Advertising & Marketplace Report, vol. 12, Issue 13, Jun. 1998, p. 6.

Database of Corporate ResourceNet, "Goto.com Chooses Quest's SharePlex(R) for Oracle Software to Ensure Uptime for Business-Critical Web Site", PR Newswire, Jun. 2000.

Database of Corporate ResourceNet, "Capitalist Tool", Time Canada, vol. 151, Issue 8. Mar. 1998, p. 41.

Database of DialogClassic(m), :Homestead Technologies' Continued Success Draws $17.50 Million In second Round of Venture Funding, PR Newswire, Apr. 1999.

"APS Search Tools—Patent Search Client Strategy", by US Patent & Trademark Office, Sep. 1997.

"Frequently Asked Questions NT Image Search & Retrieval (IS&R)", by US Patent & Trademark Office, Dec. 1997.

"Chapter 1—Introduction to Dialog", by Dialog Information Service, Inc. pp. 1-1 to 1-14.

"Automated Patent System (APS) Workstation Reference Manual", by US Patent & Trademark Office, Jul. 1996.

Frentzen, Jeff, "Help for Getting the Word Out About Web Sites", PC Week, v14, n46, p. 27(1), Nov. 3, 1997.

Miller, Karen L., "Improve Your Ranking (Building Web Sites to Attract Web Searches)", Home Office Computer, v16, n1, p. 51(2) Jan., 1998.

Wingfiled, "Another Engine Takes Ads By The Click", from http://www.news.com?news/Item/0.4.1387,00/html, May 1996.

Pelline, "New Search Engine Goes Commerical", by CNET News.com, Feb. 1998.

Wang, "Engines Battle Irrelevance of Results—New Search Service Hope To Fill The Void", by Internet World, Feb. 1998.

Vondr Haar, "Searching For The Highest Bidder", from Inter@active week.

Riedman, "Search Engine Startup To Auction Listings", from Interactive-Advertising, Feb. 1998.

Rich, "New Search Engine Allows Sites To Pay Their Way to Top", from http://www.adweek.com/iq/iqnews02.asp.

Mardesich, "Web Site Operators Pay for Top Billing—Search Engine Allows Site Sponsors to Buy Place On Special List", from Knight Ridder Newspapers, Mar. 1998.

Hilty, "GoTo.Hell—What Happens When On Line Search Engine Accepts Cash From Web Sites?" from http://www.ocweekly.com/link/archives/97/27/byte-3.11.98-1.html, Mar. 1998.

Flynn, "With GoTo.com's Search Engine, the Highest Bidder Shall Be Ranked First", by the New York Times, Mar. 1998.

Clark, "Start-Up Plans Internet Search Service Tying Results To Advertising Spending", from the Wall Street Journal, Feb. 1998.

"Going, Going . . . ", from A Closer Look of the Wall Street Journal-Marketplace, Apr. 1998.

"Coursey.com", David Coursey's Insider report on Personal Computing, the Internet and Communications, Mar. 1998.

Glaser, "Who Will GoTo.com", from OnlinePress.com, Feb. 1998.

Mardesic, "Search Engine Charges Hit Sites", from http://www.sjmercury.com/business/center/goti022198.html, Feb. 1998.

"News Watch About Search Engines", from http://searchenginewatch.com/ness.html, Feb. 1998.

Wang, "Engines Battle Irrelevence of Results", from Intenet World.

Swartz, "Browser Only Lists Paying Web Sites Critics Fear Approach Will Squeeze Out Most Small Internet Players", from http://www.sfgate.com/cgi-bin/ publish on San Francisco Chronicle, Feb. 1998.

McWilliams, PC World Online, Feb. 23, 1998, "Search Engine To Sell Top Positions On Results Lists", from http://www.pcworld.com/news/daily/data/ 0298/ . . . . html.

"Search Engine Start Up To Auction Listings", from http://www.adage.com/interactive/daily/index/html, Feb. 1998.

Alyson, "Searching The Search Engines", from Bacon's, May 1998.

Pelline, "Pay-for-placement gets another shot", from http://www.newscom.?news/item/0,4,19307,00.html, Sep. 1997.

IBM Technical Disclosure Bulletin, "Organizing A Ranked List of Search Matches", Nov. 1994.

Jeffrey Brewer, ClickZ Today, Aug. 18, 1998, "Pay-For-Performance: Creating More And Better Value", obtained at the internet address http://www.clickz.com, Aug. 18, 1998.

Jesse Berst, ZDNet, Aug. 17, 1998, "Search Sites' Shocking Secret", obtained at the internet address http://www.zdnet.com/anchordesk/story/story_2432.html, Aug. 17, 1998.

Sara Fisher, "Budding Internet Firm Finds Niche in Satisfaction", L.A. Business Journal, Aug. 10, 1998.

"Disclosure Rules", The Industry Standard—The Newsmagazine of the Internet Economy, Aug. 10, 1998.

G. David Doran, "Pay to Play", Entrepreneur, Jul. 1998, p. 18.

Advertising Age—Interactive Daily Homepage; obtained at the internet address http://www.adage.com/interactive/daily/index.html, Jun. 8, 1998.

Kim Komando, "With About 320 Million Sites, Search Engines Offer Some Help", copyright 1998, Los Angeles Times Syndication.

Margot Williams, "How To Ease Your Online Searches", Lansing State Journal, Jun. 1, 1998.

"GoTo.com Gets Venture Funding", Internet World Magazine, Jun. 1, 1998.

Sasha Alyson, "Searching The Search Engines", Front Page, May 8, 1998.

Advertising Age—Interactive Daily Homepage, Feb. 23, 1998, "Search Engine Startup To Auction Listings", obtained at the internet address http://www.adage.com/interactive/mdaily/index.html.

Brian McWilliams, PC World Online, Feb. 23, 1998, "Search Engine To Sell Top Positions On Results Lists", obtained at the internet address http://www.pcworld.com/news/daily/data/0298/9880223173204.html.

Jon Swartz, San Francisco Chronicle, Feb. 23, 1998, "Browser Only Lists Paying Web Sites Critics Fear Appproach Will Squeeze Out Most Small Internet Players", obtained at the internet address http://www.sfgate.com/cgi-bin/arti . . . le/archive/1998/02/21/BU102470.DTL.

Nelson Wang, "Engines Battle Irrelevance of Results", from http://www.internetworld,com/print/current/news/19980223-battle.html, Feb. 1998.

Search Engine Watch, Feb. 21, 1998, "GoTo Sells Positions", obtained at the internet address http://www.searchenginewatch.com/news.html, Feb. 23, 1998.

Jodi Mardesich, "Search Engine Charges Hit Sites", from http://wwww.sjmercury.com/businrss/center/goto022198.html, Feb. 1998.

Ken Glaser, Who Will GoTo.com?, OnlinePress.com, Feb. 1998.

Jeff Pelline, "New Search Engine Goes Commercial", from http://www.news.com/News/Item/ 0,4,19281,00.html, Feb. 20, 1998.

"Going, Going . . . ", The Wall Street Journal, Apr. 1998. p. B1.

David Coursey, "Coursey.com", Mar. 1998.

Don Clark, "Start-Up Plans Internet Search Service Tying Results To Advertising Spending", The Wall Street Journal, Feb. 20, 1998.

Laurie J. Flynn, "With GoTo.com's Search Engine, The Highest Bidder Shall Be Ranked First", The New York Times, Mar. 1998, p. C1.

Wyn Hilty, OCWeekly byte marks, "GoTo.Hell", from http://www.ocweekly.com/ink/archives/97/27byte-3.11.98-1.shtml, Mar. 13, 1998.
Jodi Mardesich, "Web Site Operators Pay For Top Billing", The News—Herald (Willoughby, OH), Mar. 2, 1998.
Laura Rich, Adweek Online IQ News Online, Feb. 23, 1998, "New Search Engine Allows Sites to Pay Their Way to Top", from http://www.adweek.com/iq/iqnews02.asp, Feb. 1998.
Patricia Riedman, "Search Engine Startup To Auction Listings", Advertising Age Magazine, Feb. 23, 1998, p. 34.
Steven Vonder Haar, ZDNet,com, Feb. 19, 1998, "Searching For The Highest Bidder", obtained at the internet address http://www.zdnet.com/intweek/daily/980219i.html, Feb. 23, 1998.
Nelson Wang, "Engines Battle Irrelevance of Results", Internet World, Feb. 10, 1998, p. 1.
Interactive Week Magazine, Garden City, N.Y. May 25, 1998.
Jeff Pelline, "New Search Engine Goes Commercial", CNET News.com, from http://www.news.com/News/Item/0,4,19281,00.html, Feb. 20, 1998.
Nick Wingfield, Staff Writer, CNET News.com, Jun. 21, 1996, "Engine Sells Results, Draws Fire", obtained at the internet address http://www.news.com/News/Item/Textonly/0,25,1635,00.html, Jul. 29, 1999.
Nick Wingfield, Staff Writer, CNET News.com, May 22, 1996, "Another Engine Takes Ads By The Click", obtained at the internet address http://www.news.com/News/Item/0,4,1387,00.html, Jul. 29, 1999.
Rose Aguilar, Staff Writer, CNET News.com, Apr. 29, 1996, "New Ad Model Charges By The Click", obtained at the internet address http://www.news.com/News/Item/0,4,1199,00.html, Jul. 29, 1999.
Alex Lash, Staff Writer, CNET News.com, Dec. 11, 1996, "Open Text Updates Tools", obtained at the internet address http://www.news.com/News/Item/0,4,6118,00.html, Jul. 29, 1999.
"About SearchUP, Inc.", Jul. 15, 1999, obtained at the internet address http://www.searchup.com/about.cfm.
"Testimonials"., Jul. 15, 1999, obtained at the internet address http://www.searchup.com/testimonials.cfm.
"Benefits", Jul. 15, 1999, obtained at the internet address http://www.searchup.com/benefits.cfm.
"Information", Jul. 15, 1999, obtained at the internet address http://www.searchup.com/information.cfm.
"Tips & Tricks", Jul. 15, 1999, obtained at the internet address http://www.searchup.com/tipsandtricks.cfm.
Correspondence from Bryan Buck, President of SearchUp.com, Jul. 7, 1999.
Saul Hansell "Alta Vista Invites Advertisers to Pay for Top Ranking", The New York Times, Apr. 15, 1999, p. C2.
Galore—Super Search Engine, May 21, 1999, obtained at the internet address http://www.galore.com/1/mainframe.shtml.
hitsgalore.com Search Engine, May 21, 1999, obtained at the internet address http://www.hitsgalore.com.
I Seek It "The Next Generation Search Engine", May 21, 1999, obtained at the internet address http://www.iseekit.com.
Correspondence from Emilia F. Cannella to Robert Brahms, CEO of BeFirst Internet Corporation regarding findwhat.com, Jul. 20, 1999.
Correspondence from Emilia F. Cannella to Michael Melcher, MC Services regarding SearchUP.com, Jul. 1, 1999.
Correspondence from Emilia F. Cannella to Robert G. Schuler, Esq., Kegler, Brown, Hill & Ritter regarding iseekit.com, Jul. 1, 1999.
Correspondence from Emilia F. Cannella to Andrew Conru, Vote Publishing regarding galore.com, Jun. 30, 1999.
SearchUP.com—Internet Directory, Automated Bid Placement System, obtained at the internet address http://www.searchup.com/search.cfm, Aug. 25, 1999.
SearchUP: URL Position Manager, obtained at the internet address https://www.securearea.net/searchup/login.cfm, Aug. 25, 1999.
SearchUP: URL Position Manager, obtained at the internet address https://www.securearea.net/searchup/newaccount.cfm, Aug. 25, 1999.
SearchUP: URL Position Manager, obtained at the internet address https://www.securearea.net/getaccount/login.cfm, Aug. 25, 1999.
Correspondence from Emilia F. Cannella to Mr. D. Reed, Reports Galore, regarding hitsgalore.com, Jun. 30, 1999.
Miller, Karen L., "Improve Your Ranking", Home Office Computer, vol. 16, No. 1, Jan. 1998, p. 51(2).
Jeff Fretzen, "Help For Getting The Word Out About Web Sites", PC Week, Vo. 14, No. 46, Nov. 3, 1997, p. 27(1).
Article from the Search Engine Report, "GoTo To Sell Positions", Mar. 3, 1998, http://www.searchenginewatch.com/sereport/9803-to-to-html.
Article from CNET News, "Engine Sells Results, Draws Fire", Jun. 21, 1996, http://www.nees.com/News?Item/0,4,1635,00.html.
Press release on Lightweight Directory Access protocol (LDAP), Netscape Comm. Corp. Mountain View, CA., Apr. 1996.
ClickMail Central directory, circa Apr. 1996.
GoTo.com, circa 1998, at www.goto.com.
Northern Light, circa 1997-98, at sirocco.northernlight.com.
Laura Rich, Adweek Online IQ News Online, Feb. 23, 1998, "New Search Engine Allows Sites to Pay Their Way to Top", from http://www.adweek.com/iq/ iqnews02.asp, Feb. 23, 1998.
Smith, Laura B., article "Going . . . Gone", PC Week, vol. 13, No. 34, Aug. 26, 1996, p. E1 (2), http://www.dialogclassic.com/DialogClassic/dialog.
Cliff Kurtzman, "Another Internet Advertising List", Internet Advertising Digest #006, dated Jun. 19, 1996, from http://www.o-a.com/archive/1996/june.0021.html, printed Sep. 28, 2001, 5 pages.
Press Release article titled "GoTo.com Announces First round of Financing, Totaling More Than $6 Million, Led by Draper, Fisher Jurvetson", *Business Wire,* dated May 19, 1998, printed from the Internet at <http://www.dialogclassic.com/main.vingw> on Nov. 9, 2000, 2 pages.
Examination report for counterpart European patent application number 03 252 891.1.

* cited by examiner

FIG. 4

USE OF EXTENSIBLE MARKUP LANGUAGE IN A SYSTEM AND METHOD FOR INFLUENCING A POSITION ON A SEARCH RESULT LIST GENERATED BY A COMPUTER NETWORK SEARCH ENGINE

REFERENCE TO COMPUTER PROGRAM LISTINGS SUBMITTED ON COMPACT DISK

A compact disc appendix is included containing computer program code listings pursuant to 37 C.F.R. 1.52(e) and is hereby incorporated by reference in its entirety. The total number of compact discs is 1 including 8,140 files and 23,892,915 bytes. Because of the large number of files contained on the compact disc, the required listing of file names, dates of creation and sizes in bytes is included on the compact disk and incorporated by reference herein.

BACKGROUND

This application relates generally to the area of database searching. More particularly, this application relates to the use of extensible markup language in a system and method for influencing a position on a search result list generated by a computer network search engine.

U.S. Pat. No. 6,269,361 discloses a system and method for influencing a position on a search result list generated by a computer network search engine. In one disclosed embodiment, the disclosed system and method provide an online advertiser account management tool. Search listings associated with advertisers are stored in a database. Each search listing has an associated search term and an advertiser-specified bid amount. In response to a search query entered by a user, search listings with matching search terms are displayed in a search result list. Search listings are ordered from highest to lowest bid amount and may be followed in the result list by unpaid listings. The bid amount is a money amount charged to the advertiser's account when a user clicks on a search listing in the search result list.

Also in accordance with a disclosed embodiment of this patent, advertisers are provided with on-line, authenticated login access to obtain account information and modify search listings. Examples of advertiser actions include viewing of past transactions, selecting notification options, adding money to the advertiser's account selecting a matching option, changing a bid amount or other component of a search listing, creating or deleting search listings, receiving a cost projection for running a search listing for a specified time or obtaining activity reports. The ability of advertisers to change bid amounts results in dynamic ranking whereby the position of a search listing in a result list can be changed by increasing or decreasing the associated bid amount, or as a consequence of other search listings changing their positions. U.S. Pat. No. 6,269,361 is commonly assigned with the present application and is incorporated herein in its entirety by this reference.

The disclosed system thus defines an on-line marketplace operated by a marketplace operator for the benefit of advertisers and potential customers of the advertisers. The marketplace serves as a source of information for potential customers and a source of new customers for the advertisers. The marketplace is highly competitive in that advertisers compete for attention of potential customers by adjusting the bid amounts of their search listings to influence their position on a search result list generated by a search engine in response to a customer search query. One example of such an on-line marketplace is operated by Overture Systems, Inc., and is accessible on the Internet at www.overture.com.

The patented system has been very successful for advertisers seeking to reach new customers and for potential customers trying to learn more about advertiser products. In fact, the patented system has been so successful that many advertisers have placed large numbers of search listings with the on-line marketplace and employ full-time managers to manage their search listings. Third party providers have developed tools that simplify access to search listings on the on-line marketplace for advertisers. The scope of some advertiser participation in the marketplace has created a need for a degree of automation of bid management by or on behalf of advertisers.

In U.S. patent application Ser. No. 09/922,028, filed Aug. 3, 2001 and commonly assigned to the assignee of the present application and entitled "System and Method For Providing Place and Price Protection In a Search Result List Generated By a Computer Network Search Engine," it is proposed to allow advertisers to set a maximum cost per click (CPC) and/or a desired rank in the desired search results. Higher-ranked search listings are displayed earlier to a searcher in a set of search results and it is presumed that a higher ranking is viewed more by potential customers and is therefore more desirable. The system adjusts the CPC for a search listing to maintain the search listing at the desired rank, if that can be done without exceeding the bid or maximum CPC. If the listing cannot be maintained at the desired rank without exceeding the bid, the system will obtain the next highest rank the bid will allow.

Further, in U.S. patent application Ser. No. 09/963,855, entitled "Automatic Advertiser Notification for a System and Method For Providing Place and Price Protection In a Search Result List Generated By a Computer Network Search Engine," filed Sep. 26, 2001 and commonly assigned to the assignee of the present application, it is proposed to provide an automated agent that acts on behalf of an advertiser to monitor advertiser-specified conditions. If any condition is met or becomes true, a message is communicated to the advertiser along with some means for the advertiser to correct the undesirable condition. For example, if the agent determines that the rank for a search listing has fallen below a threshold, an E-mail message may be sent to the advertiser with an option to return an E-mail message to the system specifying how the rank condition should be corrected.

While these features provide improved convenience for advertisers trying to manage search listings, they are only limited in their success at aiding the advertiser who has a large number of search listings to manage, or for the third party who seeks to advertise search listings for multiple advertisers. Accordingly, there is a need for an improved system and method for influencing a position on a search result list generated by a computer network search engine.

BRIEF SUMMARY

By way of introduction only, one present embodiment provides a database search apparatus and method for generating a search result list that responds to eXtensible Markup Language (XML) requests from a client. XML is a flexible way to create common information formats and share both the structural model and data over a local or distributed network such as the Internet, intranets and elsewhere. XML is a formal recommendation of the World Wide Web Consortium and is similar to the Hypertext Markup Language (HTML) used in previous web pages. XML is a meta-syntax for designing syntax models that permit the structuring of data. Both XML and HTML are languages that use markup symbols to describe the contents of a page or a file. HTML, however, describes the content of a web page only in terms of how it is to be displayed and interacted with. XML describes the content in terms of what data is being described and how it relates to the other data structures of the model. HTML and XML both use tags, which are words separated by < >, and attributes. HTML specifies a finite set of tags and meanings or uses for each tag, i.e. what each tag and attribute means. XML uses tags but XML is extensible because, unlike HTML, the tags are unlimited and self-defining.

Another present embodiment provides a bid management tool operable in conjunction with a client computer to manage search listings and account information of one or more advertisers. The bid management tool is preferably a desktop application that reports and manages paid listings on a server of an on-line marketplace. The client application communicates with the server via an XML-based application program interface. The bid management tool provides functions for reporting account activity, modifying accounts and manual, timed or event-driven changes to search listings.

The foregoing discussion of the preferred embodiments has been provided only by way of introduction. Nothing in this section should be taken as a limitation of the following claims, which define the scope of the invention.

BRIEF DESCRIPTION OF THE DRAWINGS

FIG. 4 illustrates an example of a search result list generated by one embodiment of the present system and method.

DETAILED DESCRIPTION OF THE PRESENTLY PREFERRED EMBODIMENTS

Figure 1:
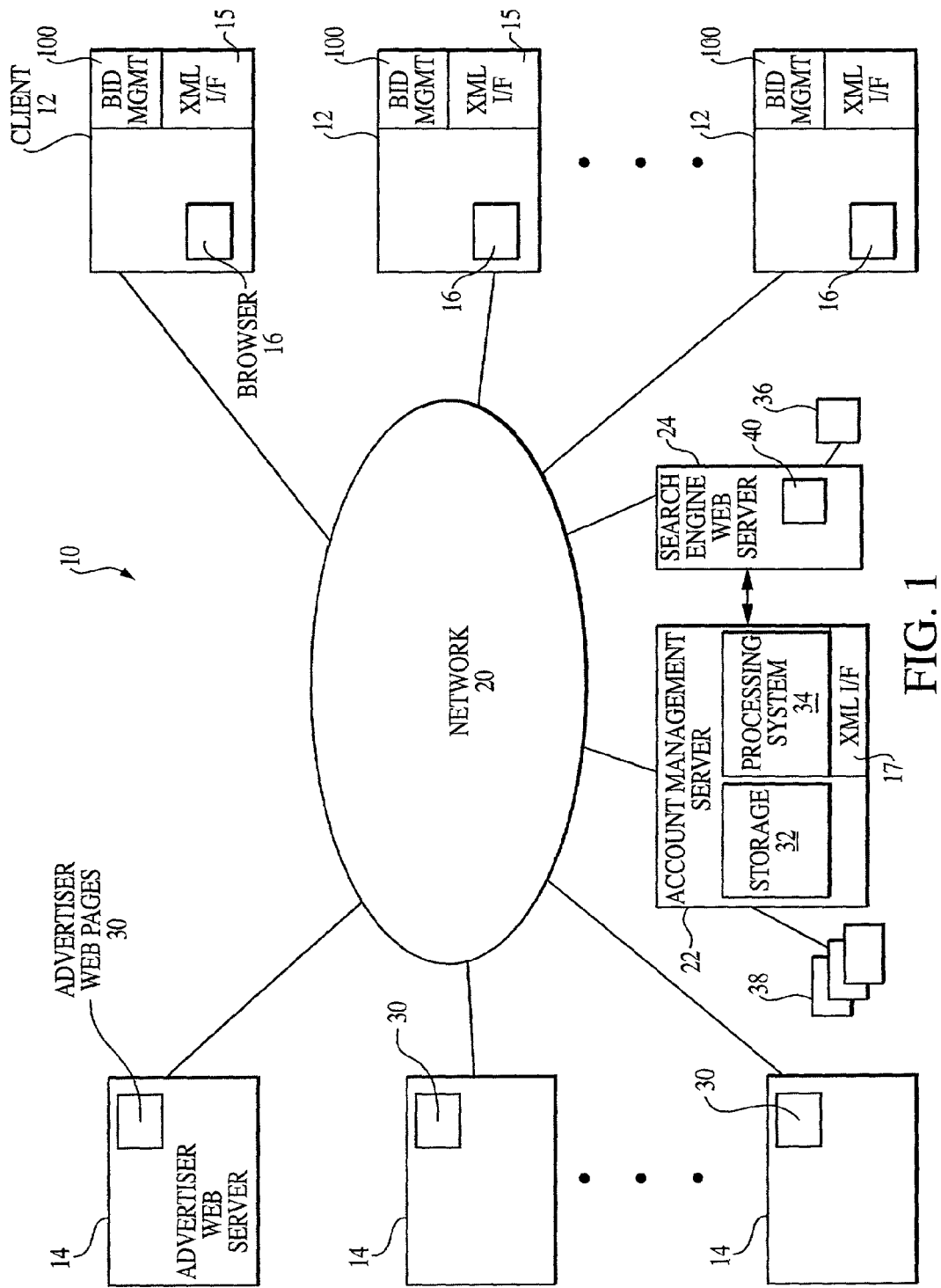
FIG. 1 is a block diagram illustrating the relationship between a large network and one embodiment of a system and method for generating a pay-for-placement search result.

Referring now to the drawings, FIG. 1 is an example of a distributed system 10 configured as client/server architecture used in one embodiment of the present invention. A client is a member of a class or group that uses the services of another class or group to which it is not related. In the context of a computer network such as the Internet, a client is a process such as a program or task that requests a service which is provided by another process, known as a server program. The client process uses the requested service without having to know any working details about the other server program or the server itself. In networked systems, a client process usually runs on a computer that accesses shared network resources provided by another computer running a corresponding server process. However, it should also be noted that it is possible for the client process and the server process to run on the same computer.

A server is typically a remote computer system that is accessible over a communications medium such as the Internet. The client process may be active in a second computer system and communicate with the server process over a communications medium that allows multiple clients to take advantage of the information-gathering capabilities of the server. Thus, the server essentially acts as an information provider for a computer network.

The block diagram of FIG. 1 therefore shows a distributed system 10 which includes a plurality of client computers 12, a plurality of advertiser web servers 14, an account management server 22, and a search engine web server 24, all of which are connected to a network 20. The network 20 will be hereinafter generally referred to as the Internet. Although the system and method of the present invention is specifically useful for the Internet, it should be understood that the client computers 12, advertiser web servers 14, account management server 22, and search engine web server 24 may be connected together through one or more of a number of different types of networks. Such networks may include local area networks (LANs), other wide area networks (WANs), and regional networks accessed over telephone lines, such as commercial information services. The client and server processes may even comprise different programs executing simultaneously on a single computer.

The client computers 12 can be conventional personal computers (PCs), workstations, or computer systems of any other size. Each client 12 typically includes one or more processors, memories, input/output devices, and a network interface, such as a conventional modem or network interface card. The advertiser web servers 14, account management server 22, and the search engine web server 24 can be similarly configured. However, advertiser web servers 14, account management server 22, and search engine web server 24 may each include many computers connected by a separate private network. In fact, the network 20 may include hundreds of thousands of individual networks of computers.

The client computers 12 can execute web browser programs 16, such as the Netscape Navigator, Microsoft Internet Explorer, or Mosaic browser programs, to locate the web pages or records 30 stored on advertiser server 14. The browser programs 16 allow the users to enter addresses of specific web pages 30 to be retrieved. These addresses are referred to as Uniform Resource Locators, or URLs. In addition, once a page has been retrieved, the browser programs 16 can provide access to other pages or records when the user clicks on hyperlinks to other web pages. Such hyperlinks are located within the web pages 30 and provide an automated way for the user to enter the URL of another page and to retrieve that page. The pages can be data records including as content plain textual information, or more complex digitally encoded multimedia content, such as software programs, graphics, audio signals, videos, and so forth.

The client computers 12 of the illustrated embodiment include a bid management tool 100. Operation of the bid management tool 100 will be described in greater detail below in conjunction with FIG. 2.

In accordance with one embodiment, the client computers 12 each implement an XML interface 15. The XML interface 15 includes program code configured to communicate with a complementary XML interface 17 of the account management server 22 according to an established XML schema understood between the users of the client software and the operator of an online marketplace. Examples of such schema are attached hereto as Appendix C and D, but it is understood that these schema are only examples and in no way limit the schema available to practice the present invention. As will be described below, the account management server 22 stores information about the account of each advertiser. The client computers 12 may access and update this information using the XML interface 15 in communication with the XML interface 17 of the account management server 22. A client computer may be operated by an advertiser managing the advertiser's search listings. Alternatively, the client computer may be operated by a third party managing the search listings of one or more advertisers. In this embodiment, the client computers 12 do not interact with the account management server 22 using a browser program but rather using the XML interface 15. An individual operating a client computer 12 may activate a browser program but the actual communication of data is controlled by the XML interface 15.

In one embodiment of the present invention, shown in FIG. 1, client computers 12 communicate through the network 20 with various network information providers, including account management server 22, search engine server 24, and advertiser servers 14 using the functionality provided by a HyperText Transfer Protocol (HTTP), although other communications protocols, such as FTP, SNMP, TELNET, and a number of other protocols known in the art, may be used. Preferably, search engine server 24, account management server 22, and advertiser servers 14 are located on or accessible over the Internet.

As discussed above, at least two types of server are contemplated in an embodiment of the present system and method. The first server contemplated is the account management server 22. This server 22 includes a computer storage medium 32 and a processing system 34. This server 22 further includes a variety of software program codes including the XML interface 17. These program codes are stored on one or more computer readable program storage media of the server 22, such as the storage medium 22.

A database 38 is also stored on the storage medium 32 of the account management server 22. The database 38 contains advertiser account information. The account information stored in the database 38 includes information about the search listings of each advertiser who participates in the on-line marketplace established by the distributed system 10. This information includes search terms, bid amounts, search listing descriptions and titles and associated URLs and other information as will be described below in greater detail. Further, the account information includes information produced by operation of the marketplace system, such as current rank and current bid for each search listing, the number of clicks recorded for search listings, a calculated click through rate (CTR) and the advertiser's account balance.

It will be appreciated from the description below that the disclosed system and method may be implemented in one or more software program codes that are stored as executable instructions on a computer storage medium, such as memories or mass storage devices, on the account management server 22. XML interface 15 or a conventional browser program 16 running on client computers 12 may be used to access advertiser account information stored on account management server 22. Preferably, access to the account management server 22 is accomplished through a firewall, not shown, which protects the account management and search result placement programs and the account information from external tampering. Additional security may be provided via enhancements to the standard communications protocols such as Secure HTTP or the Secure Sockets Layer.

The second server type contemplated is a search engine web server 24. A search engine program permits network users, upon navigating to the search engine web server URL or sites on other web servers capable of submitting queries to the search engine web server 24 through their browser program 16, to type keyword queries to identify pages of interest among the billions of pages available on the Internet. In a preferred embodiment of the present invention, the search engine web server 24 generates a search result list that includes, at least in part, relevant entries obtained from and formatted by the results of the bidding process conducted by the account management server 22. The search engine web server 24 generates a list of hypertext links to documents that contain information relevant to search terms entered by the user at the client computer 12. The search engine web server 24 transmits this list, in the form of a web page, to the network user, where it is displayed on the browser 16 running on the client computer 12. An exemplary embodiment of the search engine web server 24 may be found by navigating to the web page at URL http://www.overture.com/.

Search engine web server 24 is connected to the Internet 20. In one embodiment, search engine web server 24 includes a search database 40 which includes search listing records used to generate search results in response to user queries. In addition, search engine web server 24 may also be connected to the account management server 22. Account management server 22 may also be connected to the Internet. The search engine web server 24 and the account management server 22 of the present invention address the different information needs of the users located at client computers 12.

For example, one class of users located at client computers 12 may be network information providers such as advertising web site promoters or owners having advertiser web pages 30 located on advertiser web servers 14. These advertising web site promoters, or advertisers, may wish to access account information residing in storage 32 on account management server 22. An advertising web site promoter may, through the account residing on the account management server 22, participate in a competitive bidding process with other advertisers. An advertiser may bid on any number of search terms relevant to the content of the advertiser's web site. In one embodiment of the present invention, the relevance of a bidded search term to an advertiser's web site is determined through a manual editorial process prior to insertion of the search listing containing the search term and advertiser web site URL into the database 40. In an alternate embodiment of the present invention, the relevance of a bidded search term in a search listing to the corresponding web site may be evaluated using a computer program executing at processor 34 of account management server 22, where the computer program will evaluate the search term and corresponding web site according to a set of predefined editorial rules.

Higher bids receive more advantageous placement on the search result list page generated by the search engine 24 when a search using the search term bid on by the advertiser is executed. Generally, the bid for a search term is any economic value given by the advertiser associated with a search term upon occurrence of an agreed upon event. For example, in a pay for impression scheme, the advertiser gives up economic value when the advertiser's search listing is presented in search results sent to the searcher, whether or not the searcher clicks on the search listing. In another scheme, the advertiser gives up economic value when the searcher sees the advertiser's listing, clicks on the listing and then takes some further action, such as registering at the advertiser's web site or providing a credit card number, etc. The economic value may have any convenient and mutually agreeable form, such as a money amount deducted from an account, points or other counters added or subtracted from a log or account of the advertiser, etc.

In one embodiment, the amount bid by an advertiser comprises a money amount that is deducted from the account of the advertiser for each time the advertiser's web site is accessed via a hyperlink on the search result list page, or clicked. A searcher clicks on the hyperlink with a computer input device to initiate a retrieval request to retrieve the information associated with the advertiser's hyperlink. Preferably, each access or click on a search result list hyperlink will be redirected to the search engine web server 24 to associate the click with the account identifier for an advertiser. This redirect action, which is not apparent to the searcher, will access account identification information coded into the search result page before accessing the advertiser's URL using the search result list hyperlink clicked on by the searcher. The account identification information is recorded in the advertiser's account along with information from the retrieval request as a retrieval request event. Since the information obtained through this mechanism conclusively matches an account identifier with a URL in a manner not possible using conventional server system logs known in the art, accurate account debit records will be maintained. Most preferably, the advertiser's web site description and hyperlink on the search result list page is accompanied by an indication that the advertiser's listing is a paid listing. Most preferably, each paid listing displays information labeled cost to advertiser, which is an amount corresponding to a cost per-click paid by the advertiser for each referral to the advertiser's site through the search result list.

A second class of users at client computers 12 may comprise searchers seeking specific information on the web. The searchers may access, through their browsers 16, a search engine web page 36 residing on web server 24. Alternatively, the communication may be through the XML interface of the client computer. The search engine web page 36 includes a query box in which a searcher may type a search term comprising one or more keywords. Alternatively, the searcher may query the search engine web server 24 through a query box hyperlinked to the search engine web server 24 and located on a web page stored at a remote web server. When the searcher has finished entering the search term, the searcher may transmit the query to the search engine web server 24 by clicking on a provided hyperlink. The search engine web server 24 will then generate a search result list page and transmit this page to the searcher at the client computer 12.

The searcher may click on the hypertext links associated with each listing on the search results page to access the corresponding web pages. The hypertext links may access web pages anywhere on the Internet, and include paid listings to advertiser web pages 18 located on advertiser web servers 14. In a preferred embodiment of the present invention, the search result list also includes non-paid listings that are not placed as a result of advertiser bids and are generated by a conventional Internet search engine, such as the INKTOMI, LYCOS, or YAHOO! search engines. The non-paid hypertext links may also include links manually indexed into the database 40 by an editorial team. Most preferably, the non-paid listings follow the paid advertiser listings on the search results page.

Figure 2:
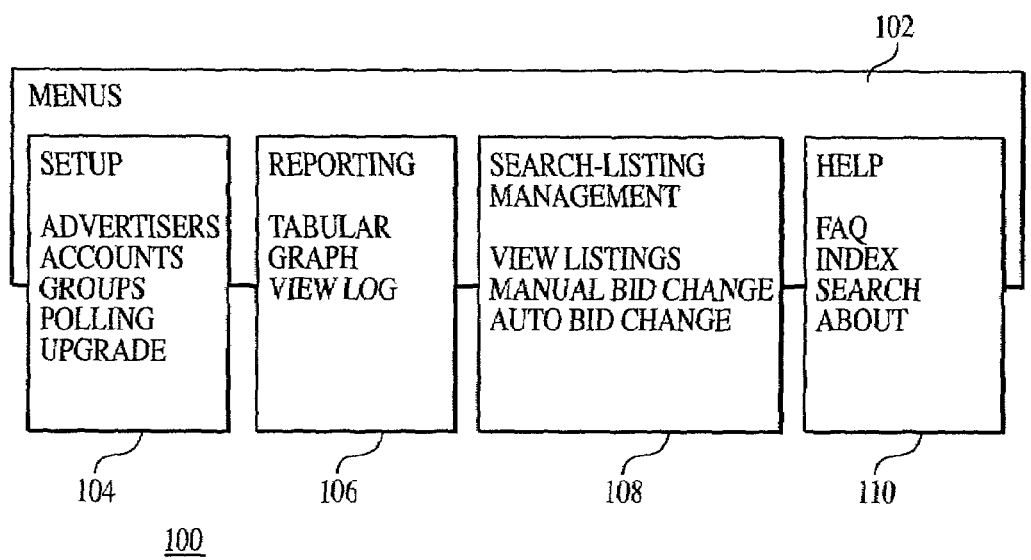
FIG. 2 illustrates functional components of a bid management tool which may be operated in conjunction with a client computer of the system of FIG. 1.

FIG. 2 illustrates functional components of a bid management tool 100 which may be operated in conjunction with a client computer 12 of the system of FIG. 1. The bid management tool 100 in the illustrated embodiment includes a plurality of menus 102, a setup function 104, a reporting function 106, a search listing management function 108 and a help function 110.

The bid management tool 100 cooperates with the XML interface 15 (FIG. 1) to report and manage paid search listings in the on-line marketplace established by the distributed system 10 described above in conjunction with FIG. 1. The bid management tool 100 is a client application that communicates with servers such as the account management server 22 and search engine web server 24 (FIG. 1) by means of the XML interface 15 of the client computer 12. The bid management tool 100 provides functions for reporting account activity, modifying accounts, and manual, timed or event-driven bid changes. The bid management tool 100 can manage the search listings of one advertiser or a plurality of advertiser. Despite the convenient name applied here, the bid management tool 100 may be configured to manage all aspects of the accounts of one or more advertisers on the on-line marketplace.

Using XML communication between the client computer and a server, the bid management tool 100 establishes a downstream link from the server to the client and an upstream link from the client to the server. The downstream line carries information about the current market state and client account. The market state includes a set of search listing. Each listing, in one embodiment, includes a current rank of the advertiser's search listing among all search listings for the associated search term, a current bid, a title, a description and a URL. Other information, such as a desired rank or a maximum cost per click, may also be conveyed. Client account information includes, for example, the number of clicks recently billed to the advertiser and the account balance. Other client account information, such as a click through rate (CTR) for some specified period, may be conveyed as well. The upstream link communicates requests from the client, such as a request for a bid change or a request to add one or more new search listings for specified search terms to the advertiser's account.

The bid management tool 100 may be configured to operate on a regular schedule. For example, the bid management tool 100 can poll the remote account management server periodically, such as every five minutes. In another example, the tool 100 allows automatic bid updates to run on a predetermined schedule, such as hourly. The user of the client computer can also initiate manual bid updates.

The management tool 100 allows a user to define groups of search terms. Such terms may be grouped according to any rules that may be established by the user. The groups of search terms may relate to particular products or services, particular advertisers, if the bids of more than a single advertiser are being managed, or any other convenient market parameter. The tool 100 further allows a user to generate reports for the defined groups and to schedule automatic updates for all terms in the group. An automatic update may adjust the current bid amount, current desired rank, or any other search listing parameter. A single instance of the tool 100 may enable one user to manage multiple advertisers, accounts, and listings. Each advertiser may have multiple accounts and each account usually holds multiple listings.

The bid management tool 100 stores information locally, on a storage medium of the client computer. The stored information includes market state, client account and group definitions. Actions initiated by the bid management tool 100 that change the market state, such as bid changes, are also locally stored and are viewable in reports produced by the tool 100.

The bid management tool 100 may be implemented in any manner appropriate for a given client computer. In one embodiment, the bid management tool 100 includes one or more computer readable program codes stored on a storage device such as a hard disk or memory of the client computer 12. The client computer includes a processor and communications interface. The processor operates in conjunction with the bid management tool program codes to perform the functions described herein. In one preferred embodiment, the bid management tool 100 is an application installable on a personal computer or other processing device operating under one or more versions of the Microsoft Windows operating system. Preferably, the tool 100 has an automatic update function which can initiate a communication session with a web site to determine if a new version of the application is available for download. If so, the user may be prompted to initiate the download and update process, which the proceeds automatically.

In FIG. 2, the bid management tool 100 includes menus 102 which permit user interaction with the bid management tool 100. Preferably, in a client computer operating under the Windows operating system, the menus 102 follow Windows menu conventions and functionality so as to simplify operation by the user. However, the menus 102 may be customized to the particular application of the bid management tool 100. In other operating systems, other menu systems may be substituted.

The menus 102 provide a user interface for data entry and option selection. One menu may be accessed to define the search terms or advertiser accounts to be managed. Another menu may be accessed to specify the format of a report. Yet another menu may be accessed to initiate an operation. Other types of menus may be provided as well. The menus interact with other data and applications stored on or accessible from the client computer, such as the XML interface 15 (FIG. 1).

Each respective menu includes appropriate fields or pop-up sub-menus of the type known in the art to receive and record entered data provided by the user. Data may be typed or otherwise entered in specified fields or selected from options provided by a pop-up menu. In addition, the menus may provide options which allow the user to simply specify all accounts of a particular advertiser. If this information is not stored locally, the bid management tool 100 may initiate a request to the account management server to obtain account identification information for the specified advertiser. For example, the bid management tool 100 may pass identifying information for the advertiser to the XML interface of the client computer. The XML interface initiates a properly formatted request and communicates the request to the account management server. Subsequently, the response is received and stored by the XML interface and the requested data is passed to the bid management tool 100.

The setup function 104 of the bid management tool 100 provides functionality for initializing and modifying the operation of the bid management tool 100. This includes defining advertisers and their associated accounts to monitor, for example, by receiving from a user a text identifier for an advertiser and determining the advertiser's account number or receiving and storing a plurality of search terms to monitor.

The setup function 104 further permits defining groups of search terms and advertisers which may be related in any convenient way. A group is a user-defined collection of search listings. A single group can include listings from multiple accounts and advertisers. A listing may appear in more than one group. In one embodiment, all group definitions are stored locally at the client computer. In other embodiments, the group definitions may be stored all or in part at a remote location such as the account management server of the on-line marketplace. From the account management server's perspective, a group transaction will include a list of operations on individual search listings. Group contents and parameters may be specified using one or more of the menus 102 or may be established by importing a text file to the bid management tool 100 from elsewhere.

The setup function 104 further permits specifying polling operations to be conducted by the bid management tool 100. Examples include time-scheduled polling according to a predetermined schedule or polling period and event-driven polling in response to the occurrence of some specified event. The setup information which serves as inputs to the setup function 104 generally is obtained using one or more menus 104. The setup information may also be obtained from storage at the client computer or by accessing the account management server 24 using the XML interface 15 of the client computer (FIG. 1). Preferably, a password or similar information is required for access to each advertiser's account information.

Also, as noted above, the setup function 104 includes an automatic upgrade function. This may be omitted or disabled at the convenience of the user.

The bid management tool 100 further includes reporting function 106. The reporting function 106 prepares reports of using information about the advertisers, accounts and listings being managed by the bid management tool 100. Exemplary reporting formats include tabular formats in which raw data are presented and graphical formats in which the raw reporting data have been processed to provide a more clearly understood illustration of the market state and client account information. Appearance and generation of the reports may be controlled by the menus 102.

The reporting function 106 in one embodiment also permits viewing of data logs maintained by the bid management tool 100. Every time a bid change is requested, manually by the user or on schedule by the bid management tool 100, an entry is added to a log file. The log file is stored at the client computer or any other convenient location. The log entry will describe either an exception, such as inability to connect to the server or failure of authentication, or details of successful bid change, including advertiser, account, term, old bid, old rank, new bid and new rank. Other information may be logged as well. The reporting function 106 permits view of the log data or reports made interpreting and presenting the log data.

The bid management tool 100 further includes the search listing management function 108. This function 108 implements the primary function of the bid management tool 100, the management of search listings, specifically making bid changes. In other embodiments, the search listing management function 108 also controls other transactions such as adding and deleting listing.

The search listing management function 108 performs both manual and automatic bid changes. Manual changes are specified by a user. A manual change is requested by identifying the listing, the account and the advertiser, and the new bid amount or other search listing parameter to be changed. This information may be entered using the menus 102. The search listing management function 108 responds to the manual change by interacting with the XML interface 15 which, in turn, initiates a request to the account management server 22 (FIG. 1). After the change has been made, a confirmation is conveyed from the server to the client. The confirmation is received by the XML interface 15, logged and an indication may be provided to the user.

By a process of automatic bid changing, the search listing management function 108 updates specified parameters of specified search listings of specified advertisers. The specifics of any automatic bid process may be established using the menus 102. Any parameter of a search listing may be changed, including the bid amount, the desired rank, the title of the search listing, etc. Search listings to be changed may be specified by specifying a group identifier if the group contents have already been defined. The timing or events which initiate a bid change operation may be specified to control the automatic bid change process.

Each application of the bid changing function includes the following operations:

1. Wake up (start) at the sched time (e.g., once per hour).
2. See whether the local copy of the market state information is current.
3. If the local copy is out of date, update the local copy.
4. Compare the market state to specified rules to identify necessary changes.
5. Send changes to the server and log success or failure.

A user may alternatively specify intra-day and day-of-week preferences, in which the advertiser is willing to pay more per click, for example, at certain times of day or on certain days of the week. The automatic bid change function may be arranged to automatically implement these preferences.

The bid management tool 100 also includes the help function 110. The help function 110 provides conveniently available, on-line access to reference information that may be required by a user of the bid management tool 100. Examples of the information that may be provided include a list of frequently asked questions (FAQ), an index of help topics, a search function for searching the information provided by the help function, and an about routine which provides revision and other information about the bid management tool 100.

In one embodiment, the presently disclosed system is embodied as a computer readable storage medium such as a CD-Rom, hard disk drive, memory or other storage device. The storage medium includes a first program code which implements the bid management tool for managing search listings on an account management server of an on-line marketplace and a second program code which implement an extensible markup language (XML) interface for communicating with a complementary XML interface of the on-line marketplace. The program codes may be source code, object code or in any other format. The bid management tool is preferably as described herein, but may include or omit various features and still provide equivalent functionality. The function of managing search listings on an account management server includes one or more of: retrieving search listings; retrieving the market state, retrieving a set of account identifiers of one or more advertisers; modifying a bid amount or other parameter of one or more search listings; adding one or more search listings associated with an advertiser; and deleting one or more search listings associated with an advertiser.

As noted, the client computer in the illustrated embodiments communicates with the account management server according to an interface 17 using XML. This interface 17 supports desktop applications of the client computer and automated tools for managing accounts with an on-line marketplace of the type described herein. The interface 17 provides a common, secure external interface at the account management server 22 (FIG. 1) for interacting with advertiser systems of the server 22. The XML interface 17 of the server 22 and the XML interface 15 of the client computer are complementary so as to provide reliable, two-way communication of requests from the client to the server and responses from the server to the client.

The design and implementation of this interface 17 rely on several assumptions. The interface 17 is a web page provided by the operator of the on-line marketplace. Requests to the interface 17 will be "Posted" to it following the HTTPS protocol. The client and the server send commands and replies using XML and UTF-8 character encoding. All communications follows the XML specification as defined by http://www.w3c.org/XML/. All applications should use an XML parser that allows for a variable amount of white space, element and attribute names and values. All parties avoid trying to manually extract data from the XML documents by using patterns that require specific field names, etc. All requests sent to the server are validated against an official request schema. All responses from the server are validated against the response schema. Any requests coming in to the account management server that do not follow the request schema are immediately rejected.

The examples provided herein relate to the DirecTraffic Center advertiser facility provided by Overture Services, Inc. It is well within the purview of those ordinarily skilled in the art to modify and extend these examples for application to other systems and other service providers.

Posting to the Account Management Server

The interface 17 defines a number of HTTP headers and parameters that are required when expecting a response from the account management server 22. The Content-Type header is required for all POST requests to the server. In one embodiment, the value of this header is "application/x-www-form-urlencoded". Also the Content-Length header should be specified and reflect the number of bytes being sent to the server. More information is available at the HTTP1.1 specification at ftp://ftp.isi.edu/in-notes/rfc2616.txt. The following is a list of other parameters used for posting to the account management server 22 and a brief description of each.

xml

Required. This parameter contains the XML document to be sent to the account management server. If the Content-Type header being sent is "application/x-www-form-urlencoded", then the value of this parameter must be URL encoded.

/go2/xml/XMLRequestHandler.submit

__D:/go2/xml/XMLRequestHandler.submit

Required. In this embodiment, the application server uses these parameters internally. The values specified for each should be "" (space).

contentType

Optional. The value of this parameter can be either "text/plain" or "text/xml" (the -continued

```
default).
Example POST:
POST/s/dtc/xml/index.jhtml?_DARGS=%2Fs%2Fdtc%2Fxml%2Findex.jhtml
HTTP/1.0
Content-Length: 404
Content-Type: application/x-www-form-urlencoded
xml=%3c%3fxml+version%3d%221.0%22+encoding%3d%22UTF-
8%22%3f%3e%3cDTCRequest++xmlns%3axsi%3d%22http%3a%2f%www.w3.or
g%2f2001%2fXMLSchema-
instance%22++version%3d%221.0%22++username%3d%22gototest%22++password
%3d%22qblahblaht%22%3e++%3cActions%3e++++%3cGetAccountIds%2f%3e++
%3c%2fActions%3e%3c%2fDTCRequest%3e&_D:/go2/xml/XMLRequestHandler.s
ubmit=+&/go2/xml/XMLRequestHandler.submit=&contentType=text%2fplain
```

Order of Operations

In general, there is no specific order in which commands need to be submitted to the XML server. The server processes requests in the order in which they are received. There is, however, a logical order that clients to the XML server may want to follow.

Before any listings can be retrieved or bid prices adjusted, the client computer retrieves the set of account identifiers to work with. In one embodiment, the server provides the account identifier and the marketplace that the account is valid for.

Once the client computer has the list of account identifiers to work on, the client computer may retrieve the set of listings for that account. This will provide the important listingId attribute that will be necessary for SetListing transactions. This listingId is static (i.e. it does not change), so the same listingId may be used forever to refer to a specific listing. If the listing is deleted and that listingId is used, an error will be returned. This function also provides the searchTerm attribute that will be necessary for using the market state functionality.

Once the client computer has the set of listings and search terms, the client computer may get the current market state for the listings of interest. This function provides the set of search listings in the order as it would appear to a searcher receiving search results in response to a search query to the search engine web server 24 (FIG. 1). This set of search listings includes listings that do not belong to the current advertiser. The server designates the listings that the current advertiser owns by supplying the listingId.

Based on the market state, the client computer may set the bid price for each listing. One embodiment only allows a one time, fixed bid price changes requests for a listing. Other embodiments allow more than the attribute or parameter of a search listing to be changed.

Authentication

In the illustrated embodiment, the first bit of information that must be provided for every request is a version string, a login username and a password. This information must be provided in the root level DTCRequest XML tag sent by the client. All commands sent to the server should be contained in this root level tag. If any of the information in the root tag is missing or incorrect, the request will be rejected and all commands contained therein will be ignored.

For example,

```
<DTCRequest version="1.0" username="testuser" password="test password">
<!-- queries and commands go here...-->
</DTCRequest>
```

The version is a string describing the version of the XML interface 17. If it does not match the version the account management server 22 is using, an error will be sent and all commands contained in the DTCRequest will be ignored.

The username corresponds to a pre-existing username. The password should be the same password the user would use to login to account management server. If the username or password is not provided or incorrect, a response will be sent immediately and all commands contained within the DTCRequest will be ignored. The response may have the form:

<DTCResponse success="false" reason="Login failed"/>

In embodiments which give access to administrators, if the username and password provided belong to an administrator, the administrator will have the ability to perform any of the below actions for any user account.

If the login and version verification phases succeed, a successful response will be sent and all contained commands will be processed:

```
<DTCResponse success="true">
...<!-- processed command responses here -->
</DTCResponse>
```

Getting the Set of Account IDs

It may be possible that the user does not know the set of account IDs required for future commands. This function permits a query for a list. Administrators will need to provide a username for which to retrieve account IDs. For example,

```
<Actions>
<GetAccountIds dtcUsername="joebob"/>
</Actions>
```

Normal, non-administrative users would not provide the username because the server will have it from the DTCRequest tag:

```
<Actions>
    <GetAccountIds/>
</Actions>
```

If a non-administrator user specifies a dtcUsername, it will be rejected with an error code of "Permission Denied".

The response to the above request will look like this:

```
<ActionsResponse>
    <GetAccountIdsResponse success="true">
        <Account id="12345" market="US"/>
        <Account id="af3456" market="UK"/>
    </GetAccountIdsResponse>
</ActionsResponse>
```

The market field is an enumeration (defined in the Schema) denoting which marketplace the account is set for.

Retrieving Listings

In order to change the characteristics of a listing, the user must first do a query to retrieve the listing. Any requests for listings is contained in an Actions XML tag. The Actions tag contains the accounted for which all the contained queries and commands apply to. The accounted is validated against the allowed list of accountIds for a normal user. Administrators may work on any set of accountIds.

It is possible to grab a set of listings based on certain criteria, or if no criteria is specified, all listings for the specified accounted. The maximum number of listings returned if the maxCount attribute is not specified is 40. If no starting index is specified, it starts with result 1. This function by default does not return current rank for each listing. To get this information, the attribute withRank is specified with a value of "true".

EXAMPLES

1. Get all listings (up to the maximum) for account id 12345

```
<Actions accountId="12345">
    <GetListings/>
</Actions>
```

2. Get all listings to a maximum of 10 that have "car" contained in the search term for account id 12345

```
<Actions accountId="12345">
    <GetListings searchTerm="car" maxCount='10'/>
</Actions>
```

3. Get all listings to the maximum allowed that have a bid price between 0.05 and 0.10 with the current rank information.

```
<Actions accountId="12345">
<GetListings lowBid="0.05" highBid="0.10" withRank="true"/>
</Actions>
```

Other valid criteria to search on include:
Url
Title
Description

Search criteria not based on bid price match if the provided string "is contained" in that field of the search listing. Search criteria based on bid price will select listings 'greater than or equal to' the price specified in the lowBid attribute and 'less than or equal to' the price specified in the highBid attribute.

Upon successful completion, a response similar to the following will be returned:

```
<ActionsResponse success="true">
    <GetListingsResponse success="true">
        <Listing index='1' listingId="a2311" .../>
        <Listing index='2' listingId="123ac345" rank="3" .../>
    </GetListingsResponse>
</ActionsResponse>
```

The listingId should be used to refer to a particular line ad when changing its characteristics as with a SetListing request (described below).

Getting the Market State

The GetMarketState function is designed to give a snapshot of the current state for a particular search term. This can be helpful in viewing the price differences between the different ranks so one can change their bid accordingly. This function takes a marketplace id (required) and a search term (required) and returns the market state as reported by the overture consumer site. For example, 1. Show me the current listings ranked 1–5 for the US marketplace and the search term "cars".

<GetMarketState market='0' searchTerm="cars" maxCount='5'/>

The response would be something like this:

```
<GetMarketStateResponse success="true">
    <Listing rank="1" title="InvoiceDealers.com - Buy New Cars Direct"
description="Quick, easy, painless... It's new car buying made easy at
InvoiceDealers.com! Get new car pricing before you visit the dealer at
InvoiceDealers.com." siteHost="www.invoicedealers.com" bid="0.43"
currency="USD"/>
    <Listing rank="2" title="AutoMall Online - Instant Online Prices"
description="Since 1994! The smartest way to buy a car. Online instant dealer price
```

-continued quotes with registration. Guaranteed lowest prices on the Internet. Over 5,000 quality dealers." siteHost="www.automallonline.com" bid="0.42" currency="USD"/>
    <Listing rank="3" title="Extended Warranty for New or Used Cars" description="Get extended car warranty coverage for up to seven years or 150,000 miles. Save up to 60% off dealer prices. Click here for a free quote from the No. 1 online provider." siteHost="www.warrantygold.com" bid="0.38" currency="USD"/>
    <Listing rank="4" title="New Car - Get Lowest Dealer Price Fast" description="Ready to buy? Get multiple price quotes on a new car from local and online dealers fast. Submit simple, no-obligation forms powered by the leading automobile sites. Compare for best deal." siteHost="www.pricequotes.com" bid="0.37" currency="USD"/>
    <Listing rank="5" title="Lexus.com - Official Site" description="Explore the models, build your Lexus, search for a certified pre-owned Lexus, or find a dealer." siteHost="mojofarm.mediaplex.com" bid="0.36" currency="USD"/>
</GetMarketStateResponse>

Setting the Bid Price for a Listing

In one embodiment the XML interface only allows one-time, fixed bid price changes for a particular listing. Other embodiments allow modification of other fields, other bid behaviors, etc.

To change the bid price, the user provides an Actions tag with the account number that contains the listing(s) that will be changed. The accounted attribute is validated against the username and password provided in previous steps. In the SetListing tag, the listingId, as provided in the GetListings response, is specified. The next element required is the BidBehavior element, followed by the 'Fixed' element that requires the bid to be specified as an attribute.

For example,

```
<Actions accountId="123">
    <SetListing listingId="a123b455">
        <BidBehavior>
            <Fixed bid="0.50"/>
        </BidBehavior>
    </SetListing>
</Actions>
```

In one embodiment, referred to as Bid to Premium, the user can specify that the search listing always appear in the first three search listings presented with the search results. If such a change is desired, the 'B2P' element is supplied instead of the 'Fixed' element. For the B2P element, the desired rank and the maxCap (the maximum amount the advertiser is willing to pay to get to the desired rank) are required. For example,

```
<Actions accountId="123">
    <SetListing listingId="a123b455">
        <BidBehavior>
            <B2P rank="1" maxCap="0.50"/>
        </BidBehavior>
    </SetListing>
</Actions>
```

Upon successful completion, a response will come back similar to the following:

```
<ActionsResponse success="true">
    <SetListingResponse listingId="a123b455" success="true"/>
</ActionsResponse>
```

If it is not successful, the system provides a sentence describing the failure:

```
<ActionsResponse success="true">
<SetListingResponse listingId="a123b455" success="false" reason=
"Bid must be in the format #.##"/>
</ActionsResponse>
```

Appendix A, attached hereto, provides a set of exemplary requests that might be posted by a client to the account management server. Similarly, attached Appendix B provides a set of exemplary responses that might be returned to the client from the server in response to a posted request. Appendix C provides an exemplary XML schema for requests submitted by a client to the server. Appendix D provides an exemplary XML schema for responses by the server to the client. Each of these appendices are intended to be illustrative only and not limiting to the scope of the invention.

Figure 3:
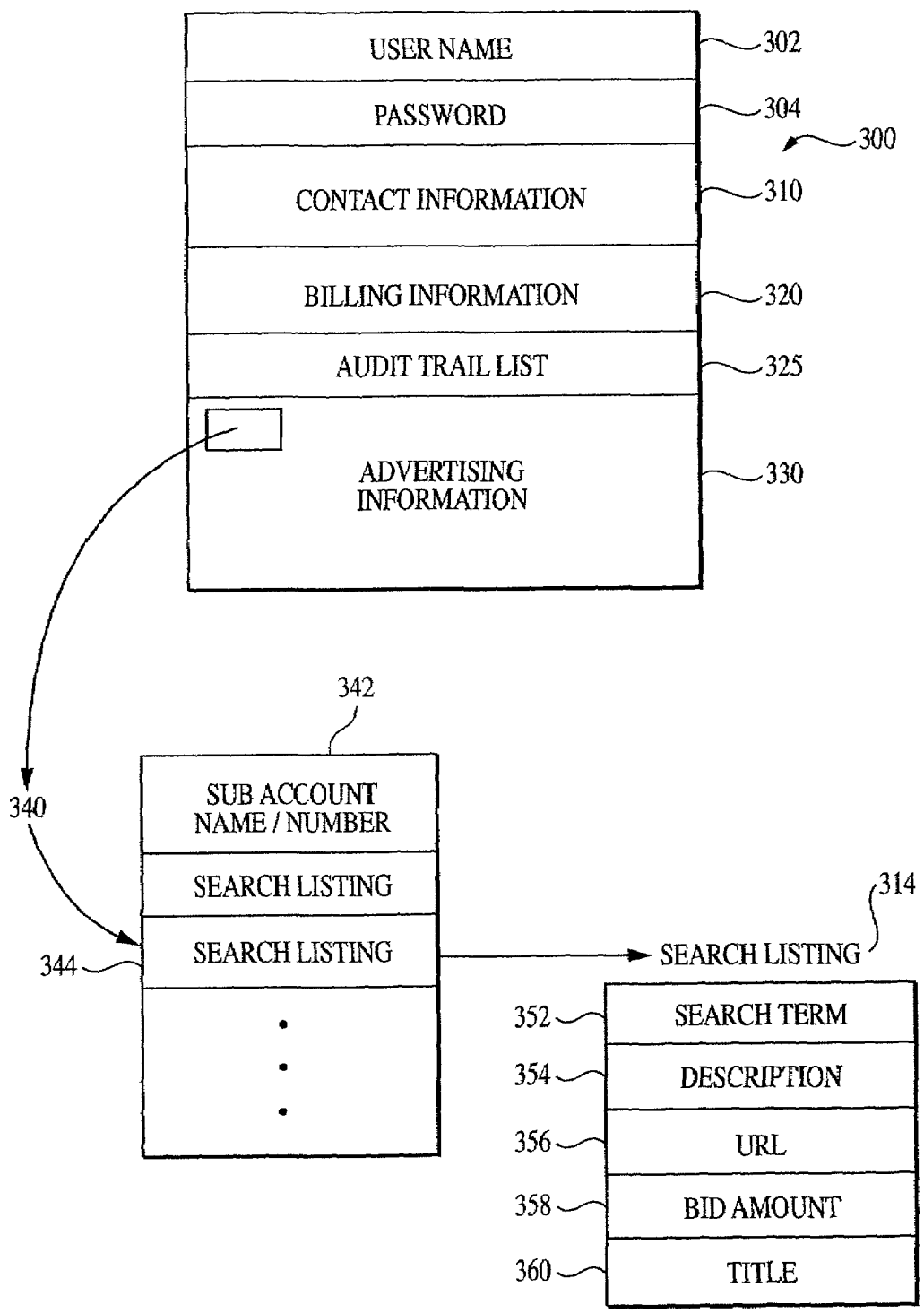
FIG. 3 is a diagram of data for an account record for use with one embodiment of the present system and method.

FIG. 3 is a diagram showing the types of information contained in each advertiser account record 300 in the search database 40 (FIG. 1). This database 40 includes search listing records used to generate search results in response to user queries. First, an advertiser account record 300 contains a username 302 and a password 304, used for online authentication as described above. The account record also contains contact information 310 such as contact name, company name, street address, phone, e-mail address.

Contact information 310 is preferably utilized to direct communications to the advertiser when the advertiser has requested notification of key advertiser events. The account record 300 also contains billing information 320, such as current balance, credit card information. The billing information 320 contains data accessed when the advertiser selects the option to add money to the advertiser's account. In addition, certain billing information such as the current balance, may trigger events requiring notification under the notification option. The audit trail section 325 of an account record 300 contains a list of all events wherein the account record 300 is accessed. Each time an account record 300 is accessed or modified by an administrator or advertiser a short entry describing the account access and/or modification event will be appended to the audit trail section 330 of the administrator or advertiser account that initiated the event. The audit trail information may then be used to help generate a history of transactions made by the account owner under the account.

The advertising information section 330 contains information needed to conduct the online bidding process of the on-line marketplace, wherein a position is determined for a web site description and hyperlink within a search result list generated by a search engine. The advertising data 330 for each user account 300 may be organized as zero or more subaccounts 340. Each subaccount 340 includes at least one search listing 344. Each search listing corresponds to a bid on a search term. An advertiser may utilize subaccounts to organize multiple bids on multiple search terms, or to organize bids for multiple web sites. Subaccounts are also particularly useful for advertisers seeking to track the performance of targeted market segments. The subaccount superstructure is introduced for the benefit of the advertisers seeking to organize their advertising efforts, and does not affect the method of operation of the disclosed system and method. Alternatively, the advertising information section need not include the added organizational layer of subaccounts, but may simply include one or more search listings.

The search listing 344 corresponds to a search term and associated bid and contains key information to conduct the online competitive bidding process. In one embodiment, each search listing comprises the following information: search term 352, web site description 354, URL 356, bid amount 358, and a title 360.

The search term 352 comprises one or more keywords which may be common words in English or any other language. Each keyword in turn comprises a character string. The search term is the object of the competitive online bidding process. The advertiser selects a search term to bid on that is relevant to the content of the advertiser's web site. Ideally, the advertiser may select a search term that is targeted to terms likely to be entered by searchers seeking the information on the advertiser's web site, although less common search terms may also be selected to ensure comprehensive coverage of relevant search terms for bidding.

The web site description 354 is a short textual description of the content of the advertiser's web site. The description 354 may be displayed as part of the advertiser's entry in a search result list. The search listing 344 may also contain a title 360 of the web site that may be displayed as the hyperlinked heading to the advertiser's entry in a search result list. The URL 356 contains the Uniform Resource Locator address of the advertiser's web site. When the user clicks on the hyperlink provided in the advertiser's search result list entry, the URL is provided to the browser program. The browser program, in turn, accesses the advertiser's web site by redirecting the browser to the web site specified by the URL. The URL may also be displayed as part of the advertiser's entry in a search result list.

The bid amount 358 in one embodiment is a money amount bid by an advertiser for a listing. This money amount is deducted from the advertiser's prepaid account or is recorded for advertiser accounts that are invoiced for each time a search is executed by a user on the corresponding search term and the search result list hyperlink is used to refer the searcher to the advertiser's web site. In other embodiments, the bid amount may be any other type of economic value given by the advertiser or received by the operator of the on-line marketplace.

Finally, a rank value is a value generated dynamically, preferably by the processing system 34 of the account management server 22 shown in FIG. 1, each time an advertiser places a bid or a search enters a search query. The rank value of an advertiser's search listing determines the placement location of the advertiser's entry in the search result list generated when a search is executed on the corresponding search term. Preferably, rank value is an ordinal value determined in a direct relationship to the bid amount 358; the higher the bid amount, the higher the rank value, and the more advantageous the placement location on the search result list. Most preferably, the rank value of 1 is assigned to the highest bid amount with successively higher ordinal values (e.g., 2, 3, 4, . . . ) associated with successively lower ranks and assigned to successively lower bid amounts.

Figure 4:
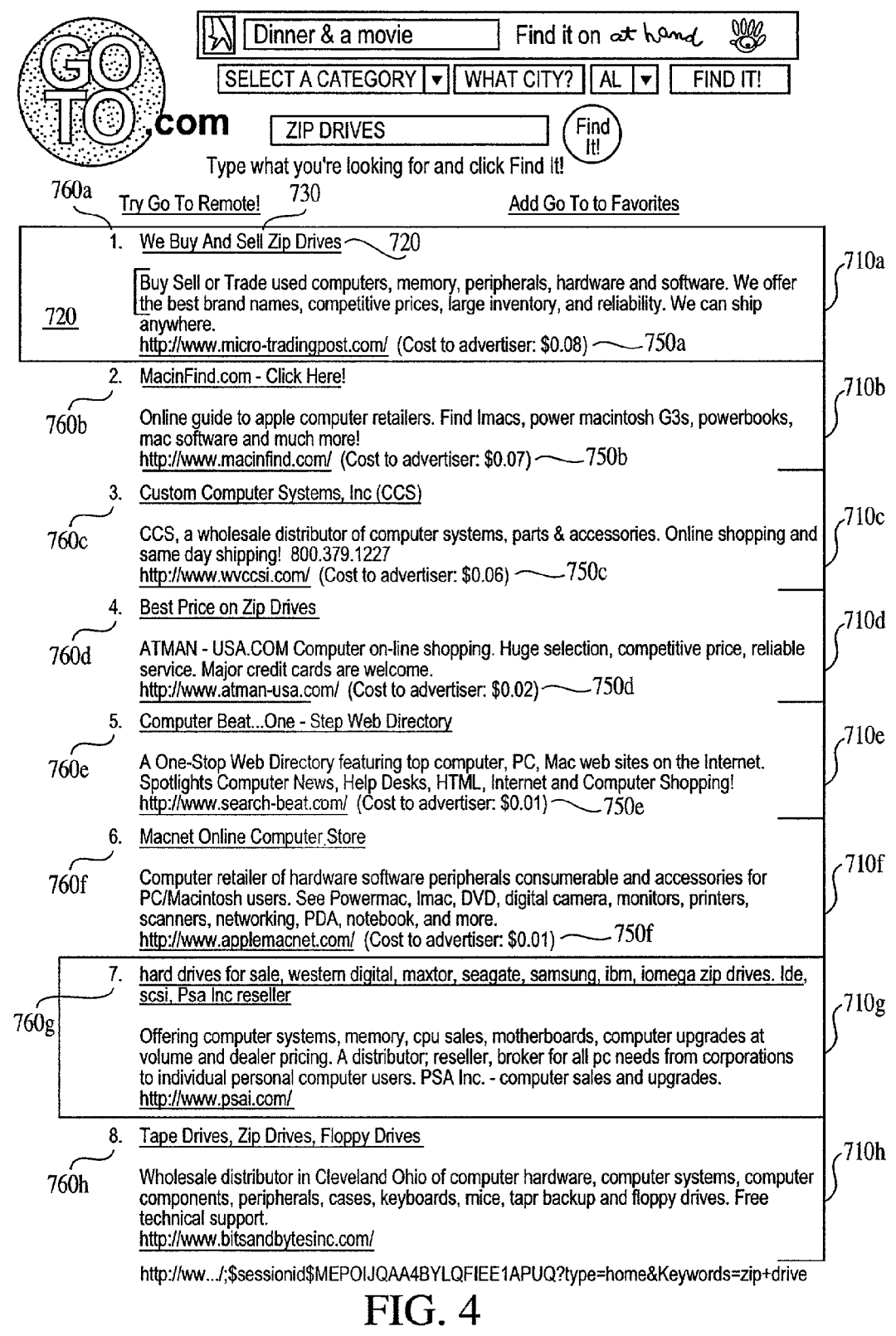

An example of a search result list display used in an embodiment of the present invention is shown in FIG. 4, which is a display of the first several entries resulting from a search for the term "zip drives". As shown in FIG. 4, a single entry, such as entry 710a in a search result list consists of a description 720 of the web site, preferably comprising a title and a short textual description, and a hyperlink 730 which, when clicked by a searcher, directs the searcher's browser to the URL where the described web site is located. The URL 740 may also be displayed in the search result list entry 710a, as shown in FIG. 4. The click through of a search result item occurs when the remote searcher viewing the search result item display 710 of FIG. 4 selects, or clicks on the hyperlink 730 of the search result item display 710. In order for a click through to be completed, the searcher's click should be recorded at the account management server and redirected to the advertiser's URL via the redirect mechanism discussed above.

Search result list entries 710a–710h may also show the rank value of the advertiser's search listing. The rank value is an ordinal value, preferably a number, generated and assigned to the search listing by the processing system 34 of FIG. 1. Preferably, the rank value is assigned through a process, implemented in software, that establishes an association between the bid amount, the rank, and the search term of a search listing. The process gathers all search listings that match a particular search term, sorts the search listings in order from highest to lowest bid amount, and assigns a rank value to each search listing in order. The highest bid amount receives the highest rank value, the next highest bid amount receives the next highest rank value, proceeding to the lowest bid amount, which receives the lowest rank value. Most preferably, the highest rank value is 1 with successively increasing ordinal values (e.g., 2, 3, 4, . . . ) assigned in order of successively decreasing rank. The correlation between rank value and bid amount is illustrated in FIG. 4, where each of the paid search list entries 710a through 710f display the advertiser's bid amount 750a through 750f for that entry. Preferably, if two search listings having the same search term also have the same bid amount, the bid that was received earlier in time will be assigned the higher rank value. Unpaid listings 710g and 710h do not display a bid amount and are displayed following the lowest-ranked paid listing. Preferably, unpaid listings are displayed if there are an insufficient number of listings to fill the 40 slots in a search results page. Unpaid listings are generated by a search engine utilizing objective distributed database and text searching algorithms known in the art. An example of such a search engine may be operated by Inktomi Corporation. The original search query entered by the remote searcher is used to generate unpaid listings through the conventional search engine.

From the foregoing, it can be seen that the presently disclosed embodiments provide an improved method and apparatus for controlling the display of search results in a search result list. The system has been improved through addition of an XML interface at the account management server and at client computers. Communication between the server and clients to control the search listings of one or more advertisers is in accordance with one or more predetermined XML schemas. The schemas define the parameters and possible data values to be used in managing advertiser accounts and search listings. In this manner, groups of search listings for multiple advertisers may be managed effectively by a single user. Moreover, automatic operations may be specified for updating search listings, obtaining the market state, receiving account information and producing reports. The disclosed system and method may be used both by advertisers to manage their own accounts and search listings and by third parties to manage the accounts and search listings of one or more advertisers.

It is therefore an advantage of the present invention to provide reliable, two-way communication of requests and responses between an account management bid tool client and an account management bid tool server through the use of complementary XML interfaces on both the client and server sides. It is a further advantage of the present invention to provide across a distributed network a common, secure external server interface for use by advertiser client systems in order to perform account management functions with an online advertising marketplace including retrieving search listings, retrieving the market state, retrieving a set of account identifiers of one or more advertisers, modifying a bid amount or other parameter of one or more search listings, adding one or more search listings associated with an advertiser and deleting one or more search listings associated with an advertiser. A further advantage of the present invention is to allow the automation of such account management functions by providing a common schema for creating requests to the server and another common schema for understanding responses from the server.

While a particular embodiment of the present invention has been shown and described, modifications may be made. It is therefore intended in the appended claims to cover all such changes and modifications which fall within the true spirit and scope of the invention.

APPENDIX A

Request examples

Get Account Ids (Normal user)

```
<?xml version="1.0" encoding="UTF-8"?>
<DTCRequest
  xmlns:xsi="http://www.w3.org/2001/XMLSchema-instance"
  version="1.0"
  username="testacct"
  password="fictionalpass">
  <Actions>
    <GetAccountIds/>
  </Actions>
</DTCRequest>
```
Get Account Ids (Admin user)

```
<?xml version="1.0" encoding="UTF-8"?>
<DTCRequest
  xmlns:xsi="http://www.w3.org/2001/XMLSchema-instance"
  version="1.0"
  username="testadminuser"
  password="fictionalpass">
  <Actions>
    <GetAccountIds dtcUsername="jimbob"/>
  </Actions>
</DTCRequest>
```
Get Listings

```
<?xml version="1.0" encoding="UTF-8"?>
<DTCRequest
  xmlns:xsi="http://www.w3.org/2001/XMLSchema-instance"
```

APPENDIX A-continued

Request examples

```
  version="1.0"
  username="testacct"
  password="fictionalpass">
  <Actions accountID="10078815">
    <!-- get all listings by search term -->
    <GetListings maxCount="40" searchTerm="coupon"/>
    <!-- get all listings by url -->
    <GetListings maxCount="40"
url="http://www.goto.com"/>
    <!-- get all listings by title words with current
rank info -->
    <GetListings maxCount="40" title="zero"
withRank="true"/>
  </Actions>
</DTCRequest>
```
Get Market State

```
<?xml version="1.0" encoding="UTF-8"?>
<DTCRequest
  xmlns:xsi="http://www.w3.org/2001/XMLSchema-instance"
  version="1.0"
  username="testacct"
  password="fictionalpass">
  <Actions>
    <GetMarketState searchTerm="coupon" market="US "/>
  </Actions>
</DTCRequest>
```
Set Listings

```
<?xml version="1.0" encoding="UTF-8"?>
<DTCRequest
  xmlns:xsi="http://www.w3.org/2001/XMLSchema-instance"
  version"1.0"
  username="testacct"
  password="fictionalpass">
  <Actions accountID="10078815">
    <!-- Change bid to $1.50 -->
    <SetListing listingID="29153393">
      <BidBehavior>
        <Fixed bid="1.50"/>
      </Bidbehavior>
    </SetListing>
    <SetListing listingID="29153323">
      <BidBehavior>
        <B2P maxCap="1.50" rank="1"/>
      <BidBehavior>
    </SetListing>
  </Actions>
</DTCRequest>
```

APPENDIX B

Server Response Examples

Get Account Ids (Normal user)

```
<?xml version="1.0" encoding="UTF-8"?>
<DTCResponse
xmlns:xsi="http://www.w3.org/2001/XMLSchema-instance"
       xsi:noNamespaceSchemaLocation="dtc.xsd"
success="true">
  <ActionsResponse>
    <GetAccountIdsResponse success="true">
      <Account id="12345" market="US"/>
      <Account id="af3456" market="UK"/>
    </GetAccountIdsResponse>
  </ActionsResponse>
</DTCResponse>
```
Get Account Ids (Admin user)

```
<?xml version="1.0" encoding="UTF-8"?>
<DTCResponse
xmlns:xsi="http://www.w3.org/2001/XMLSchema-instance"
       xsi:noNamespaceSchemaLocation="dtc.xsd"
```

APPENDIX B-continued

Server Response Examples

```
success="true">
  <ActionsResponse>
    <GetAccountIdsResponse success="true">
      <Account id="12345" market="US"/>
      <Account id="af3456" market="UK"/>
    </GetAccountIdsResponse>
  </ActionsResponse>
</DTCResponse>
```

Get Listings

```
<?xml version="1.0" encoding="UTF-8"?>
<DTCResponse
xmlns:xsi="http://www.w3.org/2001/XMLSchema-instance"
        xsi:noNamespaceSchemaLocation="dtc.xsd"
success="true">
  <ActionsResponse>
    <GetListingsResponse success="true">
      <Listing listingID="29153391"
        url="http://mappedtocouponurl.com/"
        searchTerm="best web site for coupon"
        bid="0.13" title="Title mapped to
'coupon'"
        description="Desc mapped to 'coupon'"
        market="US" online="true"/>
      <Listing listingID="29153393"
        url="http://mappedtocouponurl.com/"
        searchTerm="coupon" bid="0.49"
        title="Title mapped to 'coupon'"
        description="Desc mapped to 'coupon'"
        market="US" online="true"/>
    </GetListingsResponse>
    <GetListingsResponse success="true">
      <Listing listingID="26929544"
        rank="3"
        url="http://www.goto.com/"
        searchTerm="gototest123456789"
        bid="0.05" title="test"
        description="test." market="US"
online="true"/>
    </GetListingsResponse>
  </ActionsResponse>
</DTCResponse>
```

Get Market State

```
<?xml version="1.0" encoding="UTF-8"?>
<DTCResponse
xmlns:xsi="http://www.w3.org/2001/XMLSchema-instance"
        xsi:noNamespaceSchemaLocation="dtc.xsd"
success="true">
  <ActionsResponse>
```

APPENDIX B-continued

Server Response Examples

```
    <GetMarketStateResponse success="true">
      <Listing rank="1" title="Print Free Coupons from
Your Computer!" description="Print free coupons from
your computer at CoolSavings! You'll save big on
groceries, clothes, baby and kid's stuff, home
items and much more! Click here to enroll. It's
free!" siteHost="www.coolsavings.com" bid="0.39"
currency="USD" />
      <Listing rank="2" title="Get Free Local Coupons
at ClipACoupon!" description="It's totally free!
Enroll now to print free money saving coupons when you
want or need them. Print free coupons or receive great
online deals from our local and national merchants."
siteHost="www.clipacoupon.com" bid="0.27"
currency="USD" />
      <Listing rank="3" title="The Online Coupon
Resource" description="Click here to visit
100GreatCoupons.com. We can help to save you money on
every online purchase from major online retailers like
Amazon.com, BarnesandNoble.com, and Half.com."
siteHost="www.100greatcoupons.com" bid="0.27"
currency="USD" />
    </GetMarketStateResponse>
  </ActionsResponse>
</DTCResponse>
```

Set Listings

```
<?xml version="1.0" encoding="UTF-8"?>
<DTCResponse
xmlns:xsi="http://www.w3.org/2001/XMLSchema-instance"
        xsi:noNamespaceSchemaLocation="dtc.xsd"
success="true">
  <ActionsResponse success="true">
    <SetListingResponse listingId="29153393"
success="true"/>
    <SetListingResponse listingID="29153323"
success="true"/>
  </ActionsResponse>
</DTCResponse>
```

APPENDIX C

Exemplary Request Schema

```
<?xml version="1.0" encoding="UTF-8"?>
<!--
************************************************************
** -->
<!-- Copyright 2001, Overture
-->
<!--
-->
<!-- An XML Schema for bidding tools to programmatically access the
features -->
<!-- of DTC.
-->
<!--
************************************************************
** -->
<xsd:schema
    xmlns:xsd="http://www.w3 org/2001/XMLSchema"
    elementFormDefault="qualified">
  <xsd:element name="DTCRequest" type="DTCRequestType"/>
```

APPENDIX C-continued

Exemplary Request Schema

```xml
<!-- ****************** Request Types ****************** -->
<xsd:complexType name="RequestType">
    <xsd:attribute name="aux" type="NonEmptyString" use="optional"/>
</xsd:complexType>
<xsd:complexType name="DTCRequestType">
    <xsd:complexContent>
        <xsd:extension base="RequestType">
            <xsd:sequence>
                <xsd:element name="Actions"
                    type="ActionType"
                    minOccurs='1'
                    maxOccurs='unbounded'/>
            </xsd:sequence>
            <xsd:attribute name="version" type="NonEmptyString" use="required"/>
            <xsd:attribute name="username" type="NonEmptyString" use="required"/>
            <xsd:attribute name="password" type="NonEmptyString" use="required"/>
        </xsd:extension>
    </xsd:complexContent>
</xsd:complexType>
<xsd:complexType name="ActionType">
    <xsd:complexContent>
        <xsd:extension base="RequestType">
            <xsd:sequence>
                <xsd:element name="GetAccountIds"
                    type="AccountIdType"
                    minOccurs='0'
                    maxOccurs='unbounded'/>
                <xsd:element name="GetMarketState"
                    type="MarketStateType"
                    minOccurs='0'
                    maxOccurs='unbounded'/>
                <xsd:element name="GetListings"
                    type="GetListingType"
                    minOccurs='0'
                    maxOccurs='unbounded'/>
                <xsd:element name="SetListing"
                    type="SetListingType"
                    minOccurs='0'
                    maxOccurs='unbounded'/>
                <xsd:element name="AddListing"
                    type="AddListingType"
                    minOccurs='0'
                    maxOccurs='unbounded'/>
                <xsd:element name="DeleteListing"
                    type="DeleteListingType"
                    minOccurs='0'
                    maxOccurs='unbounded'/>
            </xsd:sequence>
            <xsd:attribute name="accountId" type="NonEmptyString" use="optional"/>
        </xsd:extension>
    </xsd:complexContent>
</xsd:complexType>
<xsd:complexType name="AddListingType">
    <xsd:complexContent>
        <xsd:extension base="RequestType">
            <xsd:attribute name="title"
                type="NonEmptyString"
                use="required"/>
            <xsd:attribute name="description"
                type="NonEmptyString"
                use="required"/>
            <xsd:attribute name="url"
                type="NonEmptyString"
                use="required"/>
            <xsd:attribute name="searchTerm"
                type="NonEmptyString"
                use="required"/>
            <xsd:attribute name="bid"
                type="BidType"
                use="required"/>
            <xsd:attribute name="isAdult"
                type="xsd:boolean"
                use="optional"/>
```

APPENDIX C-continued

Exemplary Request Schema

```
      </xsd:extension>
    </xsd:complexContent>
  </xsd:complexType>
  <xsd:complexType name="DeleteListingType">
    <xsd:complexContent>
      <xsd:extension base="RequestType">
        <xsd:attribute name="listingId" type="NonEmptyString" use="required"/>
      </xsd:extension>
    </xsd:complexContent>
  </xsd:complexType>
  <xsd:complexType name="AccountIdType">
    <xsd:complexContent>
      <xsd:extension base="RequestType">
        <!-- The dtcUsername attribute is valid only for administrative -->
        <!-- users. Any other time the username is specified, it -->
        <!-- will be ignored. -->
        <xsd:attribute name="dtcUsername" type="NonEmptyString" use="optional"/>
      </xsd:extension>
    </xsd:complexContent>
  </xsd:complexType>
  <xsd:complexType name="SetListingType">
    <xsd:complexContent>
      <xsd:extension base="RWListingType">
        <xsd:sequence>
          <xsd:element name="BidBehavior"
            type="BidBehaviorType"
            minOccurs='0'
            maxOccurs='1'/>
        </xsd:sequence>
      </xsd:extension>
    </xsd:complexContent>
  </xsd:complexType>
  <xsd:complexType name="MarketStateType">
    <xsd:complexContent>
      <xsd:extension base="RequestType">
        <xsd:attribute name="searchTerm"  type="NonEmptyString" use="required"/>
        <xsd:attribute name="market"      type="MarketType" use="required"/>
        <xsd:attribute name="startIndex"  type="xsd:integer" use="optional"/>
        <xsd:attribute name="maxCount"    type="xsd:integer" use="optional"/>
      </xsd:extension>
    </xsd:complexContent>
  </xsd:complexType>
  <xsd:complexType name="GetListingType">
    <xsd:complexContent>
      <xsd:extension base="RequestType">
        <xsd:attribute name="title"       type="NonEmptyString" use="optional"/>
        <xsd:attribute name="description" type="NonEmptyString" use="optional"/>
        <xsd:attribute name="url"         type="NonEmptyString" use="optional"/>
        <xsd:attribute name="lowBid"      type="BidType" use="optional"/>
        <xsd:attribute name="highBid"     type="BidType" use="optional"/>
        <xsd:attribute name="maxCount"    type="xsd:integer" use="optional"/>
        <xsd:attribute name="searchTerm"  type="NonEmptyString" use="optional"/>
        <xsd:attribute name="market"      type="MarketType" use="optional"/>
        <xsd:attribute name="startIndex"  type="xsd:integer" use="optional"/>
        <xsd:attribute name="withRank"    type="xsd:boolean" use="optional"/>
      </xsd:extension>
    </xsd:complexContent>
  </xsd:complexType>
```

APPENDIX C-continued

Exemplary Request Schema

```
<xsd:complexType name="BidBehaviorType">
   <xsd:complexContent>
      <xsd:extension base="RequestType">
         <xsd:sequence>
            <xsd:choice>
               <xsd:element name="Fixed"
                  type="FixedType" minOccurs='1' maxOccurs='1'/>
               <xsd:element name="B2P"
                  type="B2PType"  minOccurs='1' maxOccurs='1'/>
            </xsd:choice>
         </xsd:sequence>
      </xsd:extension>
   </xsd:complexContent>
</xsd:complexType>
<xsd:complexType name="FixedType">
   <xsd:complexContent>
      <xsd:extension base="RequestType">
         <xsd:attribute name="bid" type="BidType" use="required"/>
      </xsd:extension>
   </xsd:complexContent>
</xsd:complexType>
<xsd:simpleType name="BidType">
   <xsd:restriction base="xsd:token">
      <xsd:pattern value="[0–9]+\. [0–9] [0–9] "/>
   </xsd:restriction>
</xsd:simpleType>
<xsd:complexType name="B2PType">
   <xsd:complexContent>
      <xsd:extension base="RequestType">
         <!-- The requested rank -->
         <xsd:attribute name="rank"          type="xsd:positiveInteger"
use="required"/>
         <!-- How much the advertiser is willing to pay for the rank -->
         <xsd:attribute name="maxCap"        type="xsd:float"
use="required"/>
      </xsd:extension>
   </xsd:complexContent>
</xsd:complexType>
<xsd:complexType name="RWListingType">
   <xsd:complexContent>
      <xsd:extension base="RequestType">
         <xsd:attribute name="listingId"     type="NonEmptyString"
use="required"/>
         <xsd:attribute name="title"         type="NonEmptyString"
use="optional"/>
         <xsd:attribute name="description"   type="NonEmptyString"
use="optional"/>
         <xsd:attribute name="url"           type="NonEmptyString"
use="optional"/>
      </xsd:extension>
   </xsd:complexContent>
</xsd:complexType>
<xsd:simpleType name="MarketType">
   <xsd:restriction base="xsd:string">
      <xsd:enumeration value="US"/>
      <xsd:enumeration value="UK"/>
      <xsd:enumeration value="DE"/>
   </xsd:restriction>
</xsd:simpleType>
<xsd:simpleType name="NonEmptyString">
   <xsd:restriction base="xsd:string">
      <xsd:minLength value='1'/>
   </xsd:restriction>
</xsd:simpleType>
</xsd:schema>
```

APPENDIX D

Exemplary Response Schema

```
<?xml version="1.0" encoding="UTF-8"?>
<!--
**********************************************************************
```

APPENDIX D-continued

Exemplary Response Schema

```xml
** -->
<!-- Copyright 2001, Overture
-->
<!--
-->
<!-- An XML Schema for bidding tools to programmatically access the
features -->
<!-- of DTC.
-->
<!--
*************************************************************************
** -->
<xsd:schema
   xmlns:xsd="http://www.w3.org/2001/XMLSchema"
   elementFormDefault="qualified">
   <xsd:element name="DTCResponse" type="DTCResponseType"/>
   <xsd:complexType name="ResponseType">
      <xsd:attribute name="aux"    type="NonEmptyString"
use="optional "/>
   </xsd:complexType>
   <xsd:complexType name="StatusResponseType">
      <xsd:complexContent>
         <xsd:extension base="ResponseType">
            <xsd:attribute name="success" type="xsd:boolean"
use="required"/>
            <xsd:attribute name="reason" type="NonEmptyString"
use="optional"/>
         </xsd:extension>
      </xsd:complexContent>
   </xsd:complexType>
   <xsd:complexType name="DTCResponseType">
      <xsd:complexContent>
         <xsd:extension base="StatusResponseType">
            <xsd:sequence>
               <xsd:element name="ActionsResponse"
                  type="ActionsResponseType"
                  minOccurs='0'
                  maxOccurs='unbounded'/>
            </xsd:sequence>
         </xsd:extension>
      </xsd:complexContent>
   </xsd:complexType>
   <xsd:complexType name="ActionsResponseType">
      <xsd:sequence>
         <xsd:element name="GetAccountIdsResponse"
            type="GetAccountIdsResponseType"
            minOccurs='0'
            maxOccurs='unbounded/>
         <xsd:element name="GetMarketStateResponse"
            type="MarketStateResponseType"
            minOccurs='0'
            maxOccurs='unbounded'/>
         <xsd:element name="GetListingsResponse"
            type="GetListingResponseType"
            minOccurs='0' maxOccurs='unbounded'/>
         <xsd:element name="SetListingResponse"
            type="ListingResponseType"
            minOccurs='0' maxOccurs='unbounded'/>
         <xsd:element name="AddListingResponse"
            type="ResponseType"
            minOccurs='0' maxOccurs='unbounded'/>
         <xsd:element name="DeleteListingResponse"
            type="ListingResponseType"
            minOccurs='0' maxOccurs='unbounded'/>
      </xsd:sequence>
      <xsd:attribute name="accountId" type="NonEmptyString"
use="optional"/>
   </xsd:complexType>
   <xsd:complexType name="GetAccountIdsResponseType">
      <xsd:complexContent>
         <xsd:extension base="StatusResponseType">
            <xsd:sequence>
               <xsd:element name="Account"
                  type="AccountType"
                  minOccurs='0'
                  maxOccurs='unbounded'/>
            </xsd:sequence>
```

APPENDIX D-continued

Exemplary Response Schema

```
        </xsd:extension>
      </xsd:complexContent>
    </xsd:complexType>
    <xsd:complexType name="AccountType">
      <xsd:complexContent>
        <xsd:extension base="ResponseType">
          <xsd:attribute name="id" type="NonEmptyString" use="required"/>
          <xsd:attribute name="market" type="MarketType" use="required"/>
        </xsd:extension>
      </xsd:complexContent>
    </xsd:complexType>
    <xsd:complexType name="MarketStateResponseType">
      <xsd:complexContent>
        <xsd:extension base="MSListingResponseType">
          <xsd:attribute name="market" type="MarketType" use="required"/>
          <xsd:attribute name="searchTerm" type="NonEmptyString" use="required"/>
        </xsd:extension>
      </xsd:complexContent>
    </xsd:complexType>
    <xsd:complexType name="MSListingResponseType">
      <xsd:complexContent>
        <xsd:extension base="StatusResponseType">
          <xsd:sequence>
            <xsd:element name="Listing"
              type="MSListingType"
              minOccurs="0"
              maxOccurs="100"/>
          </xsd:sequence>
        </xsd:extension>
      </xsd:complexContent>
    </xsd:complexType>
    <xsd:complexType name="GetListingResponseType">
      <xsd:complexContent>
        <xsd:extension base="StatusResponseType">
          <xsd:sequence>
            <xsd:element name="Listing"
              type="GetListingType"
              minOccurs="0"
              maxOccurs="100"/>
          </xsd:sequence>
        </xsd:extension>
      </xsd:complexContent>
    </xsd:complexType>
    <xsd:complexType name="ListingResponseType">
      <xsd:complexContent>
        <xsd:extension base="StatusResponseType">
          <xsd:attribute name="listingId"
            type="NonEmptyString"
            use="required"/>
          <xsd:attribute name="confirmationNumber"
            type="NonEmptyString"
            use="optional "/>
        </xsd:extension>
      </xsd:complexContent>
    </xsd:complexType>
    <xsd:complexType name="RequiredListingType">
      <xsd:attribute name="title"          type="NonEmptyString" use="required"/>
      <xsd:attribute name="description"    type="NonEmptyString" use="required"/>
      <xsd:attribute name="bid"            type="BidType" use="required"/>
      <xsd:attribute name="market"         type="MarketType" use="required"/>
      <xsd:attribute name="searchTerm"     type="NonEmptyString" use="required"/>
    </xsd:complexType>
    <xsd:complexType name="MSListingType">
      <xsd:complexContent>
        <xsd:extension base="RequiredListingType">
          <xsd:attribute name="listingId"  type="NonEmptyString" use="optional"/>
          <xsd:attribute name="url"        type="NonEmptyString"
```

APPENDIX D-continued

Exemplary Response Schema

```
use="optional"/>
      <xsd:attribute name="currency"    type="CurrencyType"
use="optional"/>
      <xsd:attribute name="rank"        type="xsd:integer"
use="optional"/>
    </xsd:extension>
  </xsd:complexContent>
</xsd:complexType>
<xsd:complexType name="GetListingType">
  <xsd:complexContent>
    <xsd:extension base="RequiredListingType">
      <xsd:attribute name="listingId"   type="NonEmptyString"
use="required"/>
      <xsd:attribute name="url"         type="NonEmptyString"
use="required"/>
      <xsd:attribute name="online"      type="xsd:boolean"
use="required"/>
      <xsd:attribute name="currency"    type="CurrencyType"
use="optional"/>
      <xsd:attribute name="rank"        type="xsd:integer"
use="optional"/>
    </xsd:extension>
  </xsd:complexContent>
</xsd:complexType>
<xsd:simpleType name="CurrencyType">
  <xsd:restriction base="NonEmptyString">
    <xsd:enumeration value="USD"/>
    <xsd:enumeration value="GBP"/>
    <xsd:enumeration value="EUR"/>
  </xsd:restriction>
</xsd:simpleType>
<xsd:simpleType name="BidType">
  <xsd:restriction base="xsd:token">
    <xsd:pattern value="[0-9]+\.[0-9][0-9]"/>
  </xsd:restriction>
</xsd:simpleType>
<xsd:simpleType name="NonEmptyString">
  <xsd:restriction base="xsd:string">
    <xsd:minLength value='1'/>
  </xsd:restriction>
</xsd:simpleType>
<xsd:simpleType name="MarketType">
  <xsd:restriction base="xsd:string">
    <xsd:enumeration value="US"/>
    <xsd:enumeration value="UK"/>
    <xsd:enumeration value="DE"/>
  </xsd:restriction>
</xsd:simpleType>
</xsd:schema>
```

The invention claimed is:

1. A method of generating a search result list substantially in real time in response to a search request from a searcher using a computer network, the method comprising:

maintaining a database including a plurality of search listings, wherein each search listing is associated with a network location, at least one search term and a modifiable bid amount that is independent of other components of the search listing, the bid amount being associated with at least one of the search term and the network location, the bid amount corresponding to a money amount that is deducted from an account of a network information provider associated with the network location upon receipt of a retrieval request for the network location;

receiving extensible markup language (XML) requests from the network information provider to modify one or more search listings associated with the network information provider;

receiving a search request from the searcher;

identifying the search listings having search terms generating a match with the search request;

ordering the identified search listings into a search result list in accordance with the values of the respective bid amounts for the identified search listings;

receiving a retrieval request from the searcher to retrieve information associated with a search listing in the search result list; and recording a retrieval request event including account identification information corresponding to the network information provider, to permit maintenance of accurate account debit records.

2. A method of enabling a network information provider to update information relating to a search listing on a search result list generated by a computer network search engine, the method comprising:

maintaining an account database having at least one account record for each of a plurality of network information providers, said account record including at least one search listing which is associated with a network location, at least one search term and a modifiable bid amount that is independent of other components of the search listing, the bid amount being associated with at least one of the search term and the network location, the bid amount corresponding to a money amount that is deducted from the account record of a network information provider associated with the network location upon receipt of search requests for the network location;

receiving an extensible markup language (XML) request from a network information provider, the XML request specifying a change for a search listing in the network information provider's account record;

updating the search listing in the network information provider's account record in response to the XML request; and determining a position substantially in real time for the updated search listing in a search result list generated by the search engine in response to a search request received from a searcher using the computer network, where the search term of the updated search listing generates a match with the search request and the position of the updated search listing in the search result list is determined using the bid amount.

3. The method of claim 2 further comprising:
communicating an XML response to the network information provider in response to updating the search listing.

4. A system for enabling an advertising web site promoter using a computer network to update information relating to a search listing within a search result list generated by an Internet search engine, the system comprising:
a computer system having stored thereon a database having at least one account record for each of a plurality of advertising web site promoters using the computer network, the account record including:
at least one search listing including
a search term having at least one keyword,
a modifiable bid amount that is independent of other components of the search listing, the bid amount being associated with at least one of the search term and a network location, the bid amount corresponding to a money amount that is deducted from an account of a an advertising web site promoter associated with the network location upon receipt of a retrieval request for the network location,
a Uniform Resource Locator (URL) corresponding to the address of a document residing on a network server,
a description, and
a title;
an account balance;
extensible markup language (XML) programming code on said computer system configured to add a search listing to an account of an advertising web site promoter upon receiving a request from said advertising web site promoter;
programming code configured to process a search request from a remote computer, the search request including at least one keyword, the search request being received over the computer network from the remote computer through a web site that is publicly accessible without authentication; and
programming code configured to generate a search result list in response to the search request, the search result list including search listings from the accounts on the database, wherein the search term for each search listing in the search result list generates a match with the search request, the search listings in the search result list arranged in an order determined using the bid amounts of the search listings.

5. The system of claim 4 further comprising:
XML programming code on said computer system configured to delete a search listing to an account of an advertising web site promoter upon receiving a request from said advertising web site promoter.

6. The system of claim 4 further comprising:
XML programming code on said computer system configured to modify in substantially real time the search listing of an advertising web site promoter upon receiving a request from said advertising web site promoter.

7. The system of claim 4 further comprising:
XML programming code configured to generate an activity report for an advertising web site promoter upon receiving a request from said advertising web site promoter.

8. The system of claim 4 further comprising:
XML programming code configured to provide the advertising web site promoter with login access in response to authentication, wherein the advertising web site promoter's login access grants the advertising web site promoter access to modify the advertising web site promoter's account, the advertising web site promoter not being provided with access to modify the accounts of others.

9. The system of claim 4 further comprising:
XML programming code on said computer system for adding money to the account of an advertising web site promoter in substantially real time upon receiving a request from said advertising web site promoter.

10. The system of claim 9 further comprising:
a history of search listings included in the advertising web site promoter's account record; and
payment processing information, wherein said payment processing information is accessible to the computer system and isolated from public access via the computer network; and
a payment history.

11. The system of claim 4 further comprising:
an XML interface configured to
receive XML requests from the advertising web site promoter; and
communicate XML response to the advertising web site promoter in response to a received XML request.

12. The system of claim 4 further comprising:
an XML schema.

13. A method of enabling a web site promoters using a computer network to update information relating to a search listing within a search result list generated by a search engine in response to a search request received from a remote computer over the computer network, comprising:
maintaining an account database having at least one account record for each of a plurality of web site promoters of the computer network, said account record including
an account identifier, and
at least one search listing having a search term and a modifiable bid amount that is independent of other components of the search listing, the bid amount being associated with at least one of the search term and a network location, the bid amount corresponding to a money amount that is deducted from an account of a network information provider associated with the network location upon receipt of a retrieval request for the network location;

providing the web site promoter with authenticated login access, wherein the web site promoter's login access permits the web site promoter to modify the web site promoter's account record;

modifying a search listing of the account record upon receiving an extensible markup language (XML) request from said web site promoter; and generating a search result list comprised of search listings wherein the search term for each search listing generates a match with the search request, the search listings in the search result list arranged in an order corresponding to the bid amounts of the search listings.

14. The method of claim 13 further comprising:

receiving the XML request from the web site promoter; and parsing the XML request against an XML schema to identify the XML request.

15. The method of claim 14 further comprising:

providing an XML response to the web site promoter confirming modification of the search listing.

16. A method of enabling a web site promoters using a computer network to manage information relating to a search listing within a search result list generated by a search engine in response to a search request received from a remote computer over the computer network, comprising:

maintaining an account database having at least one account record for each of a plurality of web site promoters of the computer network, said at least one account record including an account identifier, and at least one search listing having a search term and a modifiable bid amount that is independent of other components of the search listing, the bid amount being associated with at least one of the search term and the network location, the bid amount corresponding to a money amount that is deducted from an account of a network information provider associated with the network location upon receipt of a retrieval request for the network location;

maintaining an extensible markup language (XML) schema;

receiving one or more XML requests from a web site promoter for management of one or more search listings of the web site promoter; and operating on the at least one account record in response to an XML request.

17. The method of claim 16 further comprising:

providing a market state to the web site promoter in response to the XML request.

18. The method of claim 17 wherein providing the market state comprises:

formatting an XML response including information about the market state; and communicating the XML response to the web site promoter.

19. The meted of claim 16 wherein operating on the at least one account record comprises:

modifying the modifiable bid amount in response to the XML request.

* * * * *